US010402913B2

(12) United States Patent
Wang et al.

(10) Patent No.: US 10,402,913 B2
(45) Date of Patent: Sep. 3, 2019

(54) GENERATION OF PERSONALIZED AND HYBRID RESPONSES TO QUERIES SUBMITTED FROM WITHIN TAX RETURN PREPARATION SYSTEM DURING PREPARATION OF ELECTRONIC TAX RETURN

(71) Applicant: INTUIT INC., Mountain View, CA (US)

(72) Inventors: Gang Wang, San Diego, CA (US); Luis F. Cabrera, Bellevue, WA (US); Kevin M. McCluskey, Carlsbad, CA (US); Ronald Jason Char, San Diego, CA (US); David S. Chon, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1007 days.

(21) Appl. No.: 14/814,329

(22) Filed: Jul. 30, 2015

(65) Prior Publication Data
US 2017/0032468 A1 Feb. 2, 2017

(51) Int. Cl.
*G06F 17/22* (2006.01)
*G06Q 40/00* (2012.01)

(52) U.S. Cl.
CPC .................................. *G06Q 40/123* (2013.12)

(58) Field of Classification Search
CPC .................................................... G06Q 40/123
(Continued)

(56) References Cited

U.S. PATENT DOCUMENTS 4,213,251 A 7/1980 Foundos
4,809,219 A 2/1989 Ashford et al.
(Continued)

FOREIGN PATENT DOCUMENTS

JP 2002-117121 A 4/2002
JP 2005-190425 A 7/2005
(Continued)

OTHER PUBLICATIONS

Amendment and Response dated Nov. 9, 2017 in U.S. Appl. No. 14/097,057, (31pgs.).
(Continued)

*Primary Examiner* — Samica L Norman
(74) *Attorney, Agent, or Firm* — DLA Piper LLP US

(57) ABSTRACT

A hybrid response mechanism for processing queries submitted through an interview screen of a tax preparation application. User submits query through search field of interview screen generated by tax preparation application. Response engine accesses runtime data of electronic tax return stored in data store and generates hybrid response including runtime data and an action. Hybrid response data may be alpha/numerical runtime data or data identifying runtime data and identifying or including a link to an action, e.g., a form to be completed or revised, or to prepare a new form. The hybrid search result can also include a result (such as reference materials, e.g., information about tax topics or an answer provided by an on-line community member) generated by an external computing resource such as an online community for the tax preparation application also processing the query but that is not included in the electronic tax return being prepared.

29 Claims, 23 Drawing Sheets

(58) Field of Classification Search
USPC .................................................... 705/19, 31
See application file for complete search history.

(56) References Cited

U.S. PATENT DOCUMENTS

| | | | |
|---|---|---|---|
| 5,006,998 A | 4/1991 | Yasunobu | |
| 5,495,607 A | 2/1996 | Pisello et al. | |
| 5,557,761 A | 9/1996 | Chan et al. | |
| 5,673,369 A | 9/1997 | Kim | |
| 5,742,836 A | 4/1998 | Turpin et al. | |
| 5,819,249 A | 10/1998 | Dohanich | |
| 6,078,898 A | 6/2000 | Davis | |
| 6,535,883 B1 | 3/2003 | Lee et al. | |
| 6,601,055 B1 | 7/2003 | Roberts | |
| 6,631,361 B1 | 10/2003 | O'Flaherty et al. | |
| 6,670,969 B1 | 12/2003 | Halstead et al. | |
| 6,690,854 B2 | 2/2004 | Helbing | |
| 6,697,787 B1 | 2/2004 | Miller | |
| 6,898,573 B1 | 5/2005 | Piehl | |
| 6,912,508 B1 | 6/2005 | McCalden | |
| 7,234,103 B1 | 6/2007 | Regan | |
| 7,295,998 B2 | 11/2007 | Kulkarni | |
| 7,331,045 B2 | 2/2008 | Martin et al. | |
| 7,448,022 B1 | 11/2008 | Ram et al. | |
| 7,539,635 B1 | 5/2009 | Peak | |
| 7,565,312 B1 | 7/2009 | Shaw | |
| 7,603,301 B1 | 10/2009 | Regan | |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 | 4/2010 | Burlison | |
| 7,716,094 B1 | 5/2010 | Sutter et al. | |
| 7,742,958 B1 | 6/2010 | Leek | |
| 7,747,484 B2 | 6/2010 | Stanley | |
| 7,761,333 B2 | 7/2010 | Kapp | |
| 7,778,895 B1 | 8/2010 | Baxter | |
| 7,818,222 B2 | 10/2010 | Allanson | |
| 7,849,405 B1 | 12/2010 | Coletta | |
| 7,860,763 B1 | 12/2010 | Quinn et al. | |
| 7,865,829 B1 | 1/2011 | Goldfield | |
| 7,895,102 B1 | 2/2011 | Wilks et al. | |
| 7,899,757 B1 | 3/2011 | Talan | |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,925,553 B2 | 4/2011 | Banks | |
| 8,001,006 B1 | 8/2011 | Yu et al. | |
| 8,019,664 B1 | 9/2011 | Tifford et al. | |
| 8,082,144 B1 | 12/2011 | Brown et al. | |
| 8,086,970 B2 | 12/2011 | Achtermann et al. | |
| 8,108,258 B1 | 1/2012 | Slattery | |
| 8,126,820 B1 | 2/2012 | Talan | |
| 8,190,499 B1 | 5/2012 | McVickar | |
| 8,204,805 B2 | 6/2012 | Eftekhari | |
| 8,224,726 B2 | 7/2012 | Murray | |
| 8,234,562 B1 | 7/2012 | Evans | |
| 8,244,607 B1 | 8/2012 | Quinn | |
| 8,346,635 B1 | 1/2013 | Olim | |
| 8,346,680 B2 | 1/2013 | Castleman | |
| 8,370,795 B1 | 2/2013 | Sage | |
| 8,386,344 B2 | 2/2013 | Christina | |
| 8,407,113 B1 | 3/2013 | Eftekhari | |
| 8,417,596 B1 | 4/2013 | Dunbar et al. | |
| 8,417,597 B1 | 4/2013 | McVickar | |
| 8,447,667 B1 | 5/2013 | Dinamani et al. | |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Ohm | |
| 8,560,409 B2 | 10/2013 | Abeles | |
| 8,583,516 B1 | 11/2013 | Pitt et al. | |
| 8,589,262 B1 | 11/2013 | Gang | |
| 8,607,353 B2 | 12/2013 | Rippert et al. | |
| 8,635,127 B1 | 1/2014 | Shaw | |
| 8,639,616 B1 | 1/2014 | Rolenaitis | |
| 8,682,756 B1 | 3/2014 | Tifford et al. | |
| 8,682,829 B2 | 3/2014 | Barthel | |
| 8,694,395 B2 | 4/2014 | Houseworth | |
| 8,706,580 B2 | 4/2014 | Houseworth | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,949,270 B2 | 2/2015 | Newton et al. | |
| 9,372,687 B1 | 6/2016 | Pai | |
| 9,690,854 B2 | 6/2017 | Stent et al. | |
| 9,760,953 B1 | 9/2017 | Wang et al. | |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 2002/0065831 A1 | 5/2002 | DePaolo | |
| 2002/0107698 A1 | 8/2002 | Brown et al. | |
| 2002/0111888 A1 | 8/2002 | Stanley et al. | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 | 7/2003 | Phelps | |
| 2003/0174157 A1 | 9/2003 | Hellman | |
| 2003/0182102 A1 | 9/2003 | Corston-Oliver et al. | |
| 2004/0002906 A1 | 1/2004 | Von Drehnen et al. | |
| 2004/0019540 A1 | 1/2004 | William | |
| 2004/0019541 A1 | 1/2004 | William | |
| 2004/0021678 A1 | 2/2004 | Ullah et al. | |
| 2004/0078271 A1* | 4/2004 | Morano | G06Q 20/207 705/19 |
| 2004/083164 A1 | 4/2004 | Schwartz et al. | |
| 2004/0088233 A1 | 5/2004 | Brady | |
| 2004/0117395 A1 | 6/2004 | Gong | |
| 2004/0172347 A1 | 9/2004 | Barthel | |
| 2004/0181543 A1 | 9/2004 | Wu et al. | |
| 2004/0205008 A1 | 10/2004 | Haynie et al. | |
| 2005/0171822 A1 | 8/2005 | Cagan | |
| 2005/0216379 A1 | 9/2005 | Ozaki | |
| 2005/0262191 A1 | 11/2005 | Mamou et al. | |
| 2006/0112114 A1 | 5/2006 | Yu | |
| 2006/0155618 A1 | 7/2006 | Wyle | |
| 2006/0155632 A1 | 7/2006 | Cherkas et al. | |
| 2006/0178961 A1 | 8/2006 | Stanley et al. | |
| 2006/0282354 A1 | 12/2006 | Varghese | |
| 2006/0293990 A1 | 12/2006 | Schaub | |
| 2007/0033116 A1 | 2/2007 | Murray | |
| 2007/0033117 A1 | 2/2007 | Murray | |
| 2007/0033130 A1 | 2/2007 | Murray | |
| 2007/0055571 A1 | 3/2007 | Fox et al. | |
| 2007/0094207 A1 | 4/2007 | Yu et al. | |
| 2007/0136157 A1 | 6/2007 | Neher et al. | |
| 2007/0150387 A1 | 6/2007 | Seubert et al. | |
| 2007/0156564 A1 | 7/2007 | Humphrey et al. | |
| 2007/0179841 A1 | 8/2007 | Agassi | |
| 2007/0192166 A1 | 8/2007 | Van Luchene | |
| 2007/0250418 A1 | 10/2007 | Banks et al. | |
| 2008/0059900 A1 | 3/2008 | Murray | |
| 2008/0097878 A1 | 4/2008 | Abeles | |
| 2008/0126170 A1 | 5/2008 | Leck et al. | |
| 2008/0147494 A1 | 6/2008 | Larson | |
| 2008/0162310 A1 | 7/2008 | Quinn | |
| 2008/0177631 A1 | 7/2008 | William | |
| 2008/0215392 A1 | 9/2008 | Rajan | |
| 2008/0243531 A1 | 10/2008 | Hyder et al. | |
| 2009/0024694 A1 | 1/2009 | Fong | |
| 2009/0037305 A1 | 2/2009 | Sander | |
| 2009/0037847 A1 | 2/2009 | Achtermann et al. | |
| 2009/0048957 A1 | 2/2009 | Celano | |
| 2009/0064851 A1 | 3/2009 | Morris et al. | |
| 2009/0117529 A1 | 5/2009 | Goldstein | |
| 2009/0125618 A1 | 5/2009 | Huff | |
| 2009/0138389 A1 | 5/2009 | Barthel | |
| 2009/0150169 A1 | 6/2009 | Kirkwood | |
| 2009/0157572 A1 | 6/2009 | Chidlovskii | |

(56) References Cited

U.S. PATENT DOCUMENTS

| | | |
|---|---|---|
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0131394 A1 | 5/2010 | Rutsch et al. |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pat et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1* | 2/2017 | Wang ................. G06Q 40/123 |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).

(56) References Cited

OTHER PUBLICATIONS

Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports—graphs-and-snapshots/track-the-earnings—taxes—deductions—or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor Gang Wang
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.

(56) References Cited

OTHER PUBLICATIONS

Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Communication dated Apr. 4, 2018 in Canadian Patent Application No. 2,959,230, (6 pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
PCT International Search Report for PCT/US2016/039917, Applicant: Intuit Inc., Form PCT/ISA/210 and 220, dated Oct. 11, 2016 (5pages).
PCT Written Opinion of the International Search Authority for PCT/US2016/039917, Applicant: Intuit Inc., Form PCT/ISA/237, dated Oct. 11, 2016 (6pages).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.

(56) References Cited

OTHER PUBLICATIONS

Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).

(56) References Cited

OTHER PUBLICATIONS

Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
EP Communication dated Jan. 25, 2019 issued in European Application No. 16830995.3.
Extended European Search Report dated Jan. 8, 2019 issued in European Application No. 1680995.3.
Canadian Office Action dated Nov. 6, 2018 issued in Canadian Application No. 2,993,515.

* cited by examiner

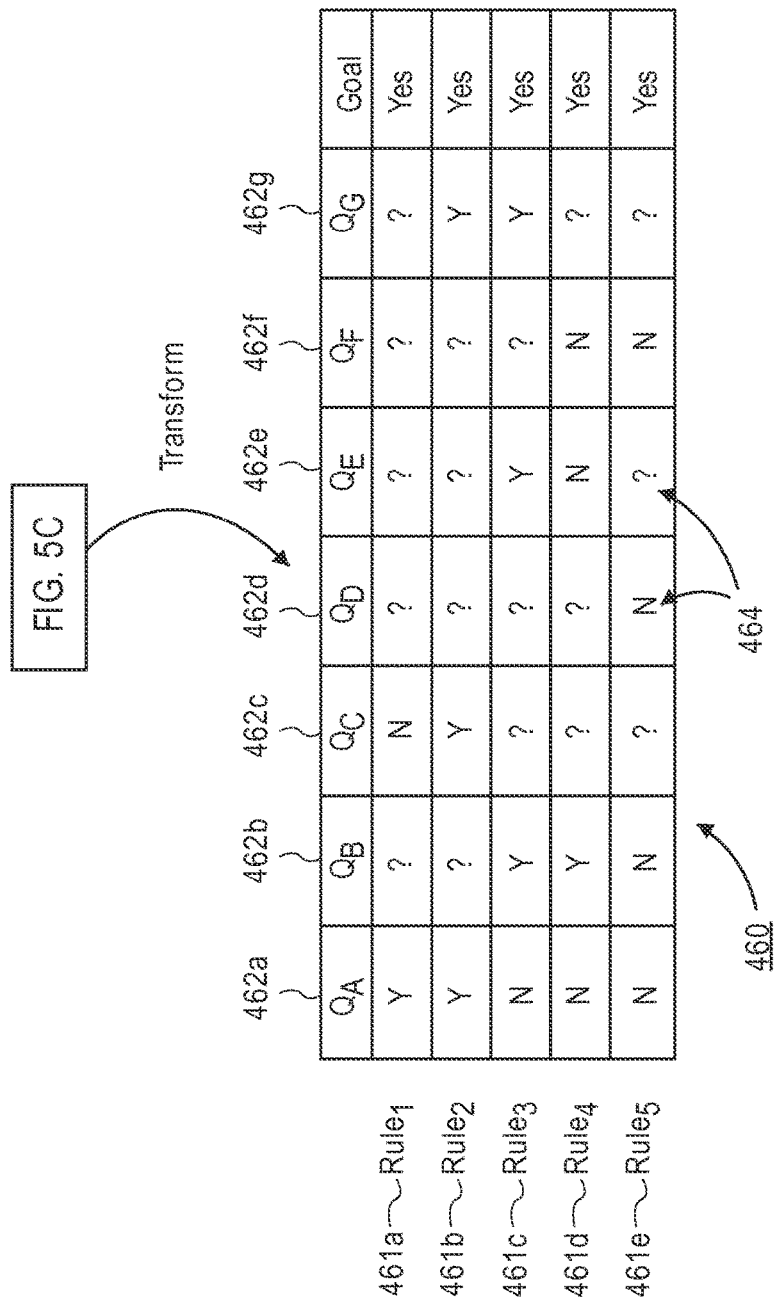

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule1 | Y | ? | ? | ? | N | ? | ? | 40% | 10% |
| Rule2 | N | Y | Y | ? | ? | ? | N | 20% | 5% |
| Rule3 | N | Y | N | Y | ? | N | ? | 14% | 6% |
| Rule4 | Y | ? | ? | ? | N | Y | N | 65% | 20% |
| Rule5 | N | Y | N | ? | ? | ? | Y | 18% | 40% |
| Rule6 | Y | Y | N | ? | ? | N | ? | 5% | 25% |

FIG. 6B

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | Y | ? | Y | Yes |
| R4 | N | Y | ? | N | N | N | ? | Yes |
| R5 | N | N | ? | ? | ? | N | ? | Yes |

FIG. 6C

GENERATION OF PERSONALIZED AND HYBRID RESPONSES TO QUERIES SUBMITTED FROM WITHIN TAX RETURN PREPARATION SYSTEM DURING PREPARATION OF ELECTRONIC TAX RETURN

BACKGROUND

Embodiments are generally related to queries made during preparation of an electronic tax return by a tax preparation application. It is known, for example, in TURBOTAX tax preparation application available from Intuit Inc., that a user may submit a question regarding a tax topic through an interview screen of the tax preparation application, and in response, the tax preparation application searches for an answer to the question in LIVE COMMUNITY on-line support for TURBOTAX tax preparation application. For example, the user may ask "which tax form do I need for topic X?" or "do I qualify for Deduction Y?" These questions are transmitted to an external resource of a server hosting the on-line support community, which provides responses of static content such as tax articles or tax authority bulletins, a copy of a form related to the query, tax advice provided from an on-line support person of LIVE COMMUNITY on-line support system or other internet search results. While these types of external "Q&A" systems have served the needs of many taxpayers in the past by providing valuable information about taxes and preparing tax returns, the capabilities of such in-product searches are limited given the constraints of known tax preparation applications.

SUMMARY

Embodiments of the invention related to query systems of computerized tax preparation applications that are operable to prepare an electronic tax return. Certain embodiments involve a tax preparation application that includes in-product search or query processing that considers dynamic, runtime data of the electronic tax return and/or that determines which action items must be addressed given the search query and associated runtime data of the electronic tax return. In certain embodiments, a response to a query submitted by the user is a hybrid or composite response that includes or involves runtime content or a snapshot of or the current runtime data of the electronic tax return or links or references thereto, and associated action items or links or references thereto. An action may be, for example, completing an interview screen, form or worksheet, beginning preparation of a new or different interview screen, form or worksheet, or reviewing a completed interview screen, form or worksheet, printing an electronic tax return, signing the electronic tax return, and filing, e.g., e-filing, the electronic tax return. Embodiments can also integrate static content from an on-line support system of the tax preparation application or other external on-line resource (e.g., results of an Internet search using the query) into a hybrid response or present these results together with a hybrid response.

Certain embodiments also involve interview screens generated by a tax preparation application and that allow a user to submit queries through an interview screen and to receive a hybrid or composite response through the same or different interview screen. Hybrid responses generated in response to a query can also be communicated to the user outside of the tax preparation program, e.g., via a separate electronic mail message or text/SMS message sent to the same or other computing or mobile communication device that is used to execute or access the tax preparation program.

Certain embodiments are related to in-product queries or search capabilities of a tax preparation application that includes modular components structured such that logic analysis regarding determining which topic or question should be presented to the user is separate from interview screens, generation or selection of interview screens and user interface functions. Thus, a user interface controller that generates or selects interview screens is divorced from or loosely coupled to a tax logic agent responsible for identifying potential topics or questions to present to a user. Certain embodiments involve a modular tax preparation system that includes a tax logic agent that performs logic computations, a user interface controller, a calculation engine that performs calculation computations, a special purpose response engine that is a component of the user interface controller or in communication between the user interface controller and a data store shared by these components. With these modular components, tax logic is separated or divorced from user interface functions such that, for example, tax logic is not programmed within an interview screen generated by the UI controller, in contrast to known tax preparation applications in which tax logic is intertwined with interview screens. Thus, user interface components of embodiments are independent of tax logic agent actions in that when processing a non-binding suggestion (e.g., according to a configuration file), the UI controller may determine whether and/or when (e.g., now, at a later time, upon receipt of other data, or at the end during final review) a non-binding suggestion is processed and a question or topic is addressed, and a hybrid response generated in response to a query submitted through an interview screen may be processed before or take priority over other non-binding suggestions generated by the tax logic agent.

One embodiment involves a computerized tax return preparation system that includes a user interface controller, a tax logic agent, a data store, and a response engine, which may be implemented as hardware, software or a combination thereof. The user interface controller is configured or programmed to present an interview screen to a user of the computerized tax preparation system. The interview screen includes a query field for entry of a query by the user through the interview screen, e.g., by the user typing a query into the field. The user interface controller is in communication with a tax logic agent, both of which share a data store. The user interface controller can write data to the shared data store, and the tax logic agent can read runtime data from the shared data store for use in analyzing rules based on a completion graph structure. The tax logic agent analysis and generation of a non-binding suggestion of a topic or question for the user interface controller and the user interface controller's generation of interview screens by the user interface controller are independent of each other. According to one embodiment, the response engine, in communication with the user interface module and the shared data store, is configured or programmed to receive the query data that was typed into the field, access the shared data store, and generate a hybrid response for the query based at least in part upon the current runtime data of the shared data store. According to one embodiment, the hybrid response includes content based on the runtime data or runtime data itself and is selected based at least in part upon the search query, and an action to be performed for preparation of the electronic tax return that is also based at least in part upon the query and the runtime data of the electronic tax return. The hybrid response is presented in an interview screen generated by the tax preparation application during preparation of the electronic tax return.

Further embodiments are directed to interview screens that provide for submission of a query through the tax preparation application during preparation of an electronic tax return and presenting a hybrid response to the query through the tax preparation application. One embodiment involves an interview screen or interview screens of a computerized tax preparation system operable to prepare an electronic tax return. According to one embodiment, an interview screen comprises a search field into which a user can type one or more terms of a query during preparation of the electronic tax return, and in response, the same or other interview screen presents a hybrid response to the query. The hybrid response includes both content based on or including runtime data of the electronic tax return stored in the shared data store and an action to be performed. A hybrid response can be integrated within the same interview screen that includes the query or in a different interview screen than the interview screen through which the query was submitted.

Other embodiments are directed to computer-implemented methods for generating hybrid responses to in-product queries or queries submitted through an interview screen of a tax preparation application. One embodiment involves a computer-implemented method for providing search capabilities in a tax preparation application operable to prepare an electronic tax return. The method includes a computerized tax logic agent reading runtime data of the electronic tax return from the shared data store, processing a decision table derived from a data structure in the form of a completion graph based at least in part upon the runtime data, generating a non-binding suggestion of a question or topic to present to a user of the tax preparation application based at least in part upon the decision table processing and providing the non-binding suggestion to a user interface controller. The method further includes the user interface controller presenting an interview screen with a search field for entry of a query by the user through the interview screen. A response engine of or associated with the user interface controller receives the query data entered into the search field by the user, accesses the shared data store, and generates a hybrid response to the query. The hybrid response includes content concerning runtime data of the shared data store and an action to be performed for preparation of the electronic tax return. The hybrid response is provided to the user interface controller, which presents an interview screen including the hybrid response to the user.

Further embodiments are directed to articles of manufacture or computer program products comprising a non-transitory computer readable storage medium embodying one or more instructions executable by one or more processors of one or more computers (e.g., via respective networks for distributed or modular tax preparation systems and remote system components) to implement method embodiments and that may be utilized by various modular system components to determine and present hybrid search results in response to a query submitted through an interview screen generated by a tax preparation application during preparation of an electronic tax return.

In a single or multiple embodiments, the response engine that provides for hybrid responses includes a query recognition component, a linking algorithm and an action identifier. The query recognition component may include or involve a natural language processing algorithm and/or a dictionary of pre-determined terms of the shared data store schema, utilized to determine or identify terms of the search query that correspond to pre-determined terms of a schema of the shared data store. The linking algorithm may be or involve a dynamic indexing algorithm, which associates runtime data of the electronic tax return in the shared data store with terms of the search query (e.g., using reverse indexing, which may involve use of a hash function), and an action identifier, which determines which actions are to be included in the hybrid response, e.g., actions defined or permitted by a schema for particular types of data.

In a single or multiple embodiments, the hybrid response content related to runtime data may include actual runtime data, e.g., actual runtime data such as $50,000 wages and $7000 federal taxes withheld, etc., or types, identifiers or field names for such data (wages, federal taxes withheld without corresponding numerical or other data), or a reference, such as a link to the actual runtime data that can be selected to view the runtime data. Runtime data can also be presented within an image or rendering of the corresponding document, interview form or worksheet. Thus, the user interface controller may generate a representation of Form-W2 populated with the currently available runtime data for Form W-2. The action of the hybrid response can also be a link to an interview screen, form or worksheet to be completed such that when the user selects the link the user is directed to the interview screen, form or worksheet. A hybrid response may include multiple actions or links for different interview screens, forms or worksheets.

In a single or multiple embodiments, the user interface controller is configured to process the hybrid response by generating or selecting an interview screen that includes the selected runtime data and the action and presenting the generated or selected interview screen to the user. According to one embodiment, the hybrid response is integrated into the interview screen that includes the search field. According to another embodiment, a different interview screen is generated and includes the hybrid search response.

In a single or multiple embodiments, an action of the hybrid response received by the user interface controller may be related to or involve the same subject matter as a non-binding suggestion that is generated by the tax logic agent and also received by the user interface controller.

For example, an action for the hybrid response may be identified by the response engine based on the shared data store including runtime data for a topic or question related to the search query and which requires additional data for completion of a tax topic, e.g., the current runtime data partially completes Form-1099, and the action item included in the hybrid response is for the user to complete Form-1099. As another example, runtime data identified based on the search query may involve multiple forms or worksheets, and if only some of these forms or worksheets have been completed or begun, the action item included in the hybrid response is to complete or prepare these other forms or worksheets. As a further example, when the response engine determines that the runtime data associated with the search query completes a form or worksheet, the action item included in the hybrid response may be for the user to review the completed form or worksheet.

In a single or multiple embodiments, the user interface controller prioritizes the hybrid search result relative to a non-binding suggestion since, for example, the user is already engaged in the subject matter of the query/hybrid response. After processing of the hybrid response, e.g., after the user completes a form per the action component of the hybrid response, the user interface controller may then proceed with acting on one or more non-binding suggestions provided by the tax logic agent. Further, in another embodiment, the user interface controller may receive the hybrid response and a non-binding suggestion and merge them into a single interview screen that is presented to the user such that subject matter of a non-binding suggestion and a hybrid result are simultaneously presented to the user.

In a single or multiple embodiments, a calculation engine is in communication with the shared data store and an read runtime data from the shared data store, perform calculations utilizing the runtime data and a calculation graph, generate a calculation result and populate a directed calculation graph with runtime data/results, and write the calculation result to the shared data store to update runtime data stored by the shared data store. Updated runtime data is read by the tax logic agent.

A calculation graph utilized by the calculation engine includes a plurality of nodes including input or leaf nodes comprising data for specific tax-related items, function nodes associated with respective functions, wherein respective input nodes are associated with respective function nodes, and inputs to a function include data of respective associated input nodes, and result nodes associated with respective functions nodes, a result node comprising an output generated by function associated with a function node. Thus, as data is written to the shared data store by the user interface controller, the calculation engine reads that updated runtime data and generates updated calculation results that are written back to the shared data store, and the tax logic agent reads the updated runtime data and generates non-binding suggestions for the user interface controller. These read/write iterations by modular or independently functioning components are repeated until a state of completeness is reached.

In a single or multiple embodiments, the user interface controller includes the response engine that generates a hybrid response, and the user interface controller, shared data store, tax logic agent and calculation engine are modular components of a distributed tax preparation application and execute on respective different computers and are in communication with each other through respective networks.

In a single or multiple embodiments, the response engine, in addition to accessing the shared data store and generating a hybrid response, also communicates with an external resource through a network. An external resource refers to a resource external to the tax preparation application, such as a computer of an on-line support community for a tax preparation application. The response engine receives a response to the entered query from the external electronic source and presents the response to the user through an interview screen. The response from the external resource may be incorporated into the same interview screen that includes the hybrid response. In contrast to runtime data of the electronic tax return, a response received from the external resource is not written to the shared data store. For example, the response from the external resource may include an answer regarding whether the user qualifies for a certain deduction or providing more general tax answers to questions of the query such as tax articles based on tax authority documents and is thus considered "static" content compared to runtime electronic tax return data that is "dynamic" or changing as it is updated.

In a single or multiple embodiments, an electronic tax return is substantially prepared or completed based on electronic tax return data that is imported from an electronic source (such as a financial management system, prior year electronic tax return, or a computer of a financial institution or employer) and written to the shared data store, and user interaction through the search field utilizing hybrid search results. This is in contrast to known tax preparation applications that have a pre-defined, fixed, linear flow of interview screens.

Given various aspects of embodiments and how embodiments may be implemented, embodiments provide improvements to various technical fields and aspects, utilization and/or efficiencies thereof including improvements to computerized tax return preparation systems, electronic tax returns, preparation of electronic tax returns, user interactions with tax return preparation systems, user interfaces, query processing and query results, and involve, for example, modifying or transforming static query responses into hybrid responses including active elements. Moreover, given the modular nature of system embodiments in which tax logic based on completeness graphs is separate from user interface controller functions and interview screens, in contrast to prior "hard-wired" approaches in which tax logic is an integral part of or encoded within interview screens, the efficiency of the tax preparation software and computers executing same are improved, and such systems provide for more flexibility by being configurable in various system and networked configurations, while allowing programmers to more easily adapt to changes in the ever-evolving tax code and to more easily update tax preparation applications and modular components thereof.

BRIEF DESCRIPTION OF THE DRAWINGS

FIGS. 3A-B generally depict interview screens of a tax preparation application including a hybrid response to a query submitted through the tax preparation application, wherein FIG. 3A illustrates a hybrid response including a runtime content component and an action component, FIG. 3B illustrates a hybrid response including an action component and data provided by an external resource in response to the query.

FIG. 6A illustrates a decision table based on or derived from a completeness graph of FIG. 5C, FIG. 6B illustrates another embodiment of a decision table that incorporates statistical data that may be used for determining a likelihood or probability of an answer to a question of the decision table according to embodiments, and FIG. 6C illustrates an example of how a rule engine may process a decision table when determining which question to select;

FIGS. 10A-C generally depict interview screens of a tax preparation application including a hybrid response to a query submitted through the tax preparation application and involving a particular tax form, wherein FIG. 10A illustrates a hybrid response for when no data for the particular tax form has been entered, FIG. 10B illustrates a hybrid response for when some but not all data for the particular form has been entered, and FIG. 10C illustrates a hybrid response for when the particular form has been completed;

DETAILED DESCRIPTION OF ILLUSTRATED EMBODIMENTS

Figure 1A:
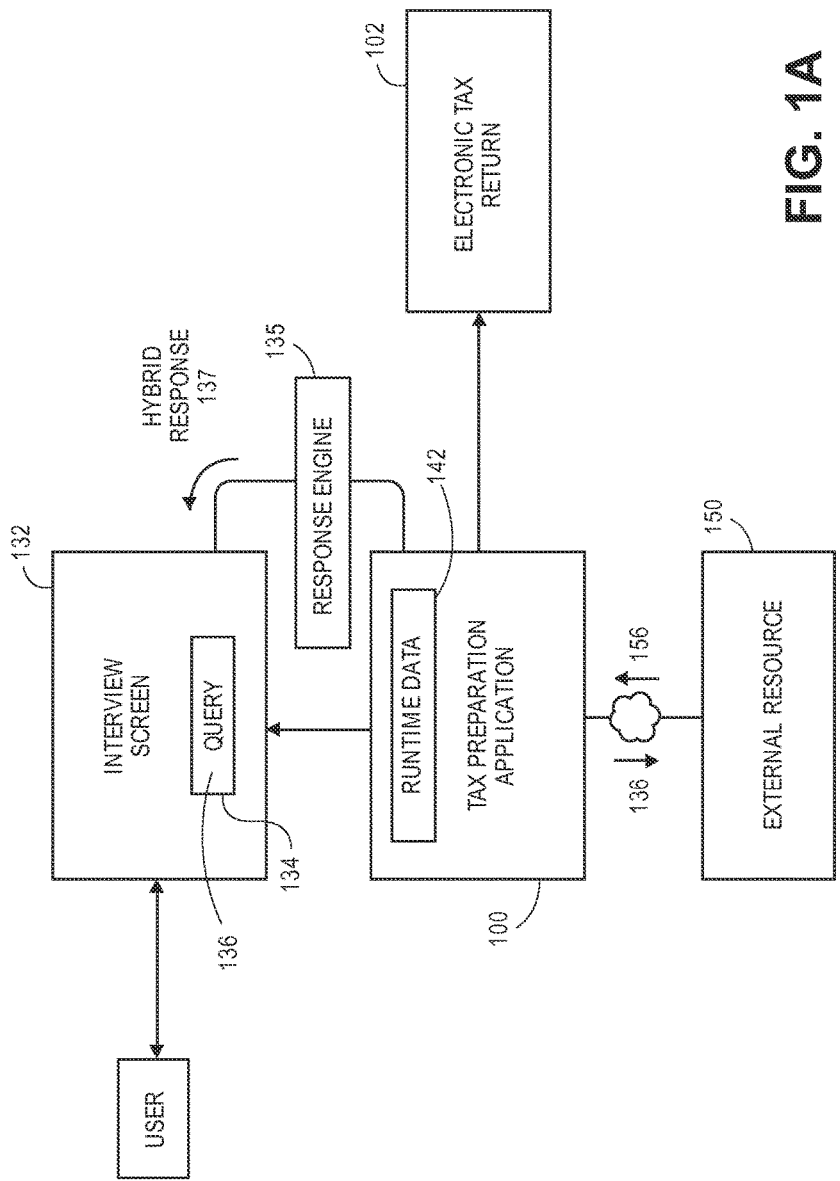
FIG. 1A is a system flow diagram illustrating how embodiments of a tax preparation system including a response engine accesses runtime data of the electronic tax return and generates a query response that is based on the runtime data.

Embodiments relate to computerized systems, computer-implemented methods, and articles of manufacture or computer program products for receiving queries through an interview screen of a tax preparation application and providing a composite or hybrid response in response to the query through the same or other interview screen generated by the tax preparation application. The hybrid response is based at least in part upon current runtime data of the electronic tax return and can include an action to be performed (e.g., a link to tax form that needs to be completed), or a combination of an action and content based on the current runtime data. When a user selects or clicks on the link the user is directed to an interview screen, form or worksheet that requires certain action (e.g., beginning preparation of an interview screen or form, completing an interview screen or form or reviewing a completed interview screen or form). Thus, embodiments provide for personalized, multi-faceted responses to in-product queries that reflect the current state of an electronic tax return, based on a snapshot of the current runtime data or certain types of current runtime data. Query processing according to embodiments are in contrast to known tax preparation applications that have a pre-defined, fixed structure of interview screens and that process in-product queries by submitting the query to an external "question-and-answer" resource such as a computer of an online support community for the tax preparation application that provides more general, procedural information such answers from community members and tax articles that are based on tax authority documents. Embodiments may also submit queries to such external resources, and any answers from such resources can be incorporated into the same or different interview screen, e.g., to supplement a hybrid response generated independently of the external resource.

Thus, if the same query is submitted to an external computing resource at different times that have different runtime data snapshots, the result would be retrieval of the same results (e.g., the same tax article), whereas with embodiments, given the ability of embodiments to handle dynamic runtime data, different hybrid responses can be generated in response to the same query at different times that have different runtime data snapshots. Thus, embodiments provide multi-faceted, in-product search capabilities based on current runtime data of the electronic tax return and provide contextual, personalized results that reflect the user's current or latest data profile and related potential user actions to be performed toward completion of the electronic tax return.

For example, given the link to and analysis of the current electronic tax return data utilized by embodiments, when a user types in a general query of "W2" into a search field of an interview screen, the resulting hybrid response may include all of the W2 forms in the tax data profile (e.g., for multiple employers and for spouse) and an action (such as a link or button) for entering another W2 form. However, if the query is more specific or personalized or for a particular taxpayer, e.g., "Tom W2" to indicate that the user is searching for Tom's Form W2 (rather than spouse "Jane's W2"), the resulting hybrid response may include content of Tom's W2 data that has been entered or that is missing and yet to be entered, and an action item (button or link) that can be selected by the user to review or edit "Tom's W2" data or enter a new W2 if a W2 form for Tom hasn't been created.

Referring to FIG. 1A, a computerized, a modular tax preparation system constructed according to one embodiment includes or involves a user or taxpayer that interacts with an interview screen 132 generated by a tax preparation application 100. Runtime data 142 that has been imported or received is used by the tax preparation application 100 to begin or prepare an electronic tax return 102. During preparation of the electronic tax return 102, the user may submit a query or question 136 in a designated query field 134 of the interview screen 132 or by selecting a "Help" menu item in response to which a query field 134 is presented. According to embodiments, a response engine 135 is configured to receive the user's query 136 and process the query 136 by accessing runtime data 142 of the electronic tax return 102 and generating a composite or hybrid response 137 (generally, hybrid response) that includes multiple components or elements. The hybrid response 137 includes a runtime data content component 137rd ("rd" referring to "runtime data" of the electronic tax return 102) and an action 137a component ("a" referring to "action") related to the runtime data 142. FIG. 1A also illustrates that embodiments may optionally incorporate "question and answer" query processing, e.g., by submitting the query 136 through a network 154 to a computer 150 or other external resource hosting an online support community (e.g., LIVE COMMUNITY on-line support system for TURBOTAX tax preparation application) and responses 156 from LIVE COMMUNITY on-line support system (e.g., an answer provided by an on-line support person or a tax authority publication related to the query) may be incorporated into the hybrid response 137 or presented with the hybrid response 137.

Figure 1B:
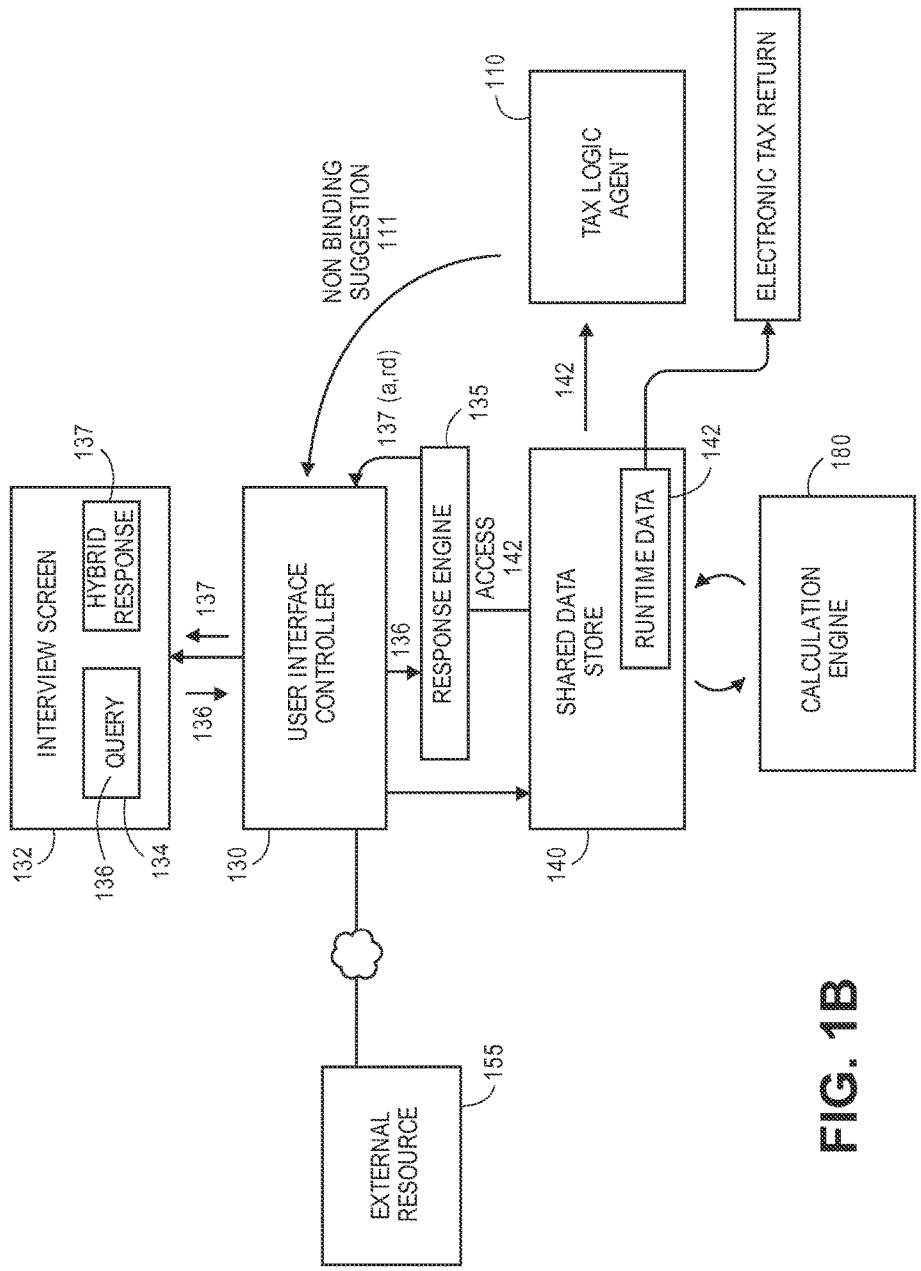
FIG. 1B is a system flow diagram illustrating embodiments of a modular tax preparation system in which determinations of possible questions or topics to present to the user by a tax logic agent are separate and independent of a user interface controller and generation and presentation of interview screens and user interactions with same, and that includes a response engine that accesses runtime data of the electronic tax return and generates a hybrid response based on the runtime data and that is presented to the use through an interview screen.

FIG. 1B illustrates an embodiment of a computerized, a modular tax preparation system that includes a user interface controller 130 loosely coupled to a tax logic agent 110 such that tax logic determinations regarding possible topics or questions to ask the user is separate from and independent of interview screens 132 generated or selected by the UI controller 130, and the UI controller may choose whether/when to present such topics or questions. A data store 140 is shared by the UI controller 130 and the tax logic agent 120 as well as a calculation engine 180. The UI controller 130 can write data (e.g., as entered by a user or imported from an electronic source) to the shared data store 140, the calculation engine 180 can read runtime data 142 from the shared data store 140, execute calculations, and write results 182 back to the shred data store 140 to update the runtime data 142. The tax logic agent 140 can read runtime data 142 as updated by the UI controller 130 and/or calculation engine 180 and determine which questions still need to be addressed before a state of completion for a topic or form, and these suggested questions are in the form of non-binding suggestions 111 that are provided by the tax logic agent 110 to the UI controller 130 for consideration and processing. In the illustrated embodiment, the response engine 135 is in communication with and between the UI controller 130 and the shared data store 140. Response engine 135 may also be a component of the UI controller 130.

Figure 2:
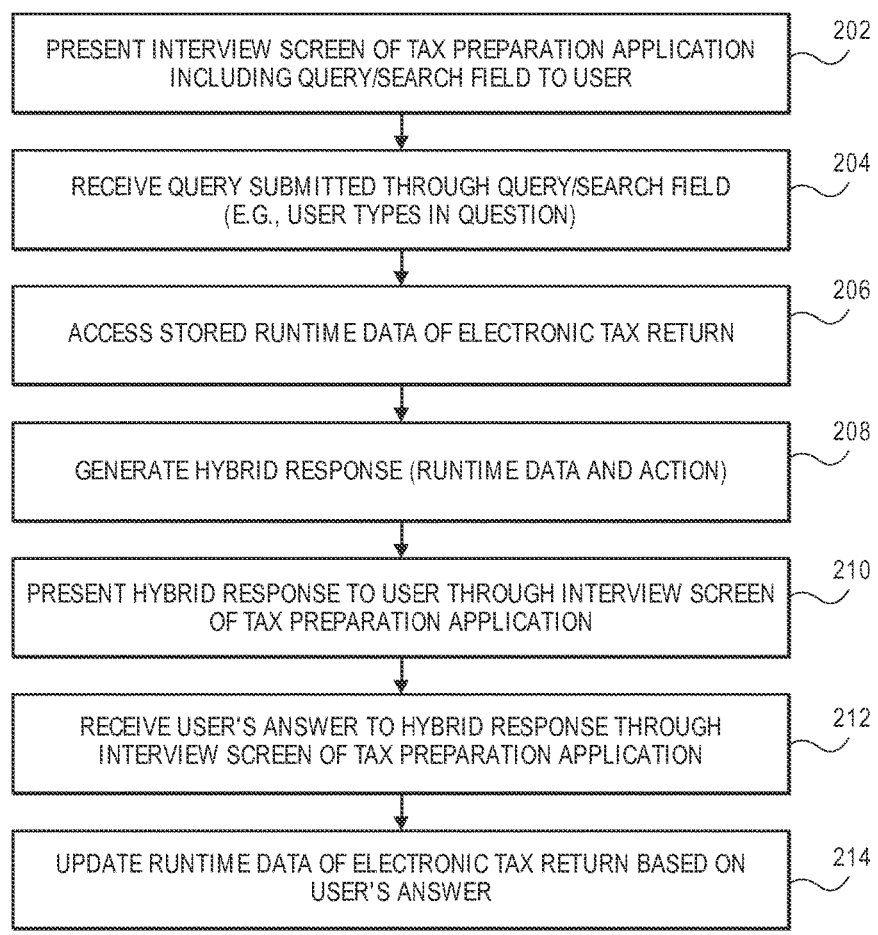
FIG. 2 is a flow diagram of one embodiment of a computer-implemented method for generating a hybrid response to a query that is presented through one or more interview screens of a tax preparation application.

With further reference to FIG. 2, in a computer-implemented method according to one embodiment, at 202, the UI controller 130 of the tax preparation application system presents an interview screen 132 to the user. The interview screen 132 includes a field 134 for a query 136. At 204, the user enters a query 136 into the field 134 and the query 136 is received by the UI controller 130, and provided to the response engine 135. At 206, the response engine 135 accesses stored runtime data 142 of electronic tax return that is stored in the shared data store 140, and at 208, generates a hybrid response 137. The hybrid response 137 includes both runtime data content 137rd and an action component 137a. At 210, the hybrid response 137 is presented to the user through the same or other interview screen 132.

Figure 3A:
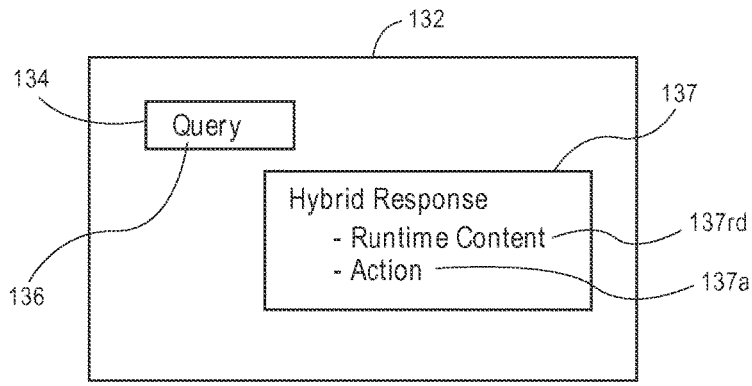
Figure 3B:
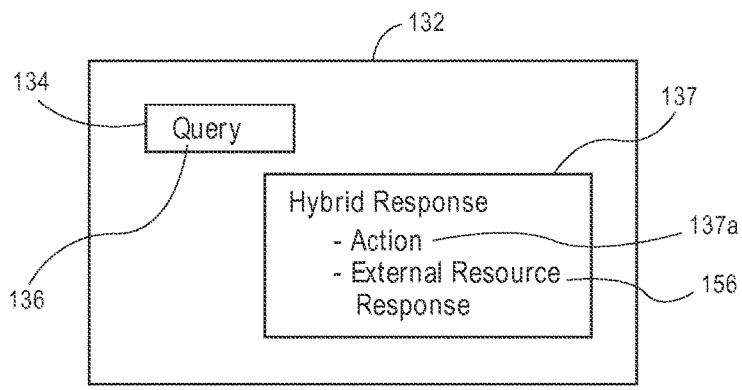
Figure 3C:
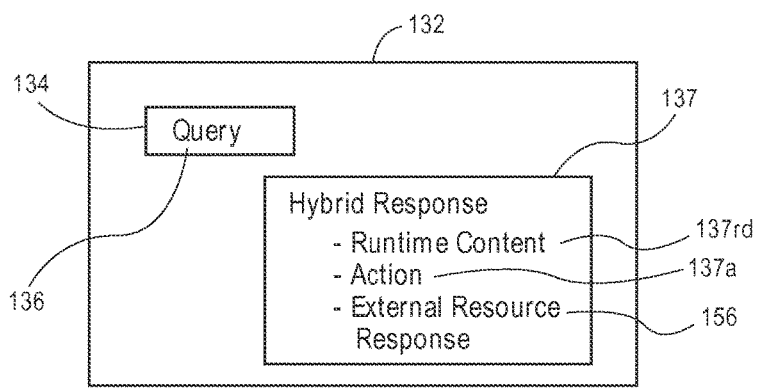
FIG. 3C illustrates a hybrid response including a runtime content component, an action component, and data provided by an external resource in response to the query.

For example, as generally illustrated in FIGS. 3A-C, a hybrid response 135 generated by response engine 135 and presented to user through an interview screen 132 may include runtime data component 137rd in the form of selected runtime data 142 pertinent to the query 136 (e.g., actual data or a label or name, category or other identifier) and an action component 137a (e.g., continue a screen form or worksheet, preparing new screen, form or worksheet, or reviewing a completed screen, form or worksheet, printing and signing an electronic tax return, and filing the electronic tax return) as generally illustrated in FIG. 3A, an action item 137a and a response 156 from an external resource 150 (such as a response from an online support community in the form of a member answer or tax article) as generally illustrated in FIG. 3B, or a combination of runtime data content 137rd, an action component 137a, and a response 156 from an external resource 150 as generally illustrated in FIG. 3C.

Referring again to FIG. 2, at 212, the user may answer or act upon the action 137a of the hybrid response 137 by, for example, providing data for the topic or form identified by the action 137a, and the user's answer is received by the UI controller 130. At 214, the UI controller 130 updates the runtime data 142 of the electronic tax return by writing the received data to the shared data store 140.

Further details regarding embodiments and aspects of embodiments are described with reference to FIGS. 4-17. FIGS. 4-10 illustrate one embodiment of a modular tax preparation system 400 in which tax logic is separate or independent of user interface functions such that these components are loosely connected or divorced from each other and that incorporates a hybrid response engine according to embodiments, and FIGS. 11-16 illustrate further aspects of how processing in-product queries and generating in-product responses, which may be a hybrid response, utilizing system components and processing described with reference to FIGS. 4-10.

Figure 4:
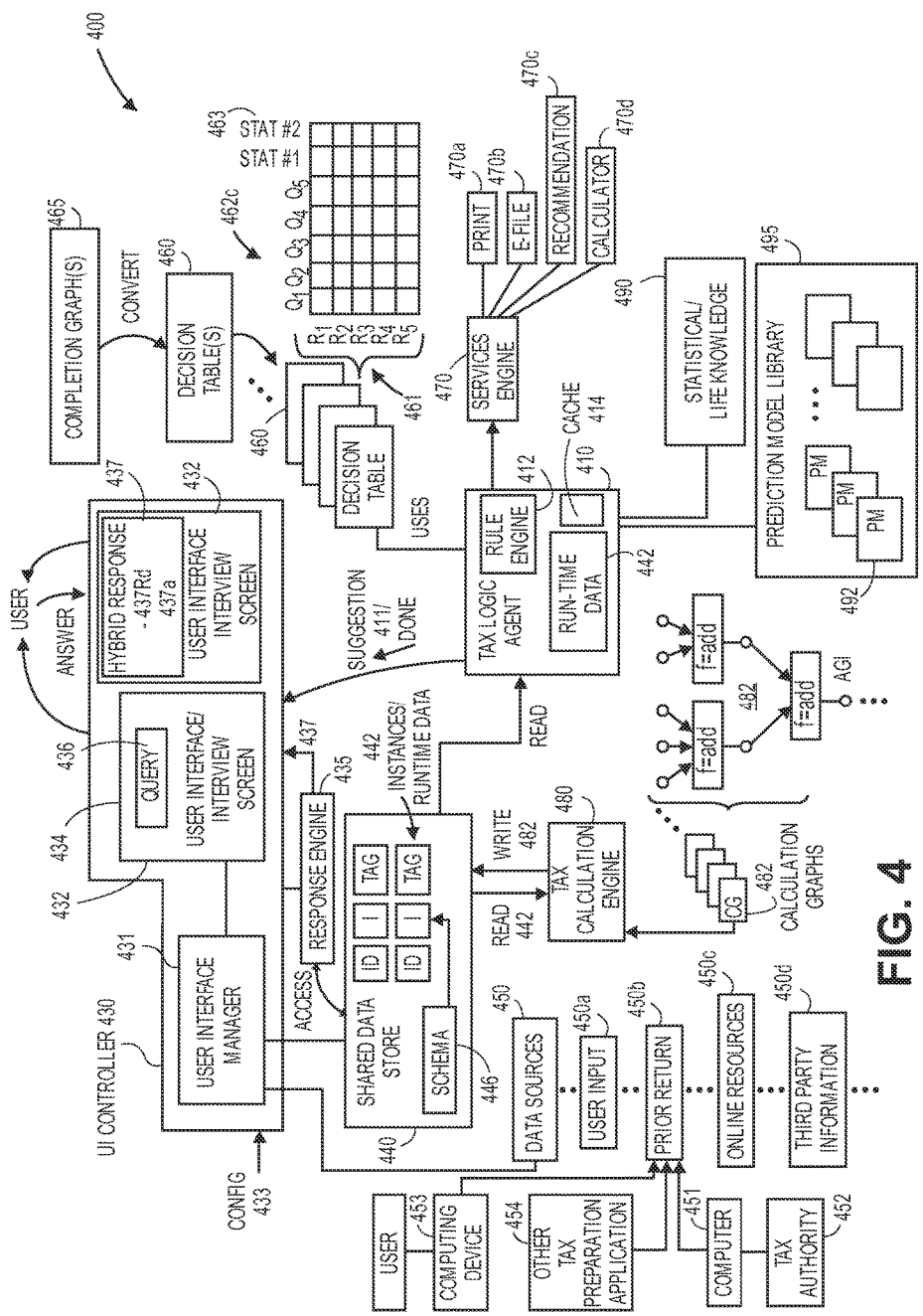
FIG. 4 is a block diagram of one embodiment of a computerized modular tax preparation system that includes a response engine that generates responses to in-product queries based on current runtime data.

FIG. 4 illustrates one embodiment of a modular tax preparation system 400 incorporating special purpose hybrid response engine according to embodiments. According to one embodiment and as illustrated, hybrid response engine 435 is a component of, or utilized by, UI controller 430. As shown in FIG. 4, hybrid response engine 435 is illustrated as a separate component that is in communication with UI controller 430 and the shared data store 440.

As shown in FIG. 4, system 400 includes tax logic agent (TLA) 410 comprising or executing a declarative rule engine or processor 412 that is used to scan or analyze decision tables 460 derived from completion graphs 465 using runtime, instance or object data 442 (generally, runtime data 442) read by TLA 410 and stored to a fact cache 414. TLA 410 generates non-binding suggestions 411 including candidate questions 462. More specifically, rule engine 412 generates either non-binding suggestions 411 of additional topic(s) or question(s) 462 to present to a user, or "Done"

instructions which indicate that completeness has occurred for a particular topic or for an electronic tax return as a whole such that no additional input for the topic or electronic tax return is not needed. Depending on system configurations, rule engine 412 may operate in the form a Drools expert engine. Other declarative rules engines 412 may be utilized and a Drools expert rule engine is provided as one example of how embodiments may be implemented. TLA 410 may be implemented as a dedicated module or engine that is executed by or as part of the tax return preparation application and may be embodied as a programmed subroutine that is executed by a processor or controller as described herein. Further, given the modular nature of system components, components may be incorporated into a tax return preparation application or be executed as a distributed system on two or more different computing systems through respective networks. For example, TLA 410 determinations can be determined separately of UI controller 430 functions, which are performed separately of calculation engine 480 processing, one or more or all of which may be managed by respective independent computers through respective networks such that communications between components described herein may be performed through respective networks between respective computing devices. Thus, embodiments provide for a flexible, modular tax return preparation system, capable of different system configurations, in which UI determinations and interview screen presentment are independent of tax logic and tax calculations.

In certain embodiments, and as illustrated in FIG. 4, TLA 410 reads runtime data 442 from shared data store 440, which is shared by UI controller 430 and tax calculation engine 480. TLA 410 can read runtime data 442 from shared data store 440, UI controller 430 can write data to shared data store 440, and calculation engine 480 can read data from shared data store 440, perform a calculation of calculation graph 482, and write a calculation result 482 to shared data store 440.

TLA 410 is operable to receive runtime or instance (I) data (generally, runtime tax return data 442) based on a "dictionary" of terms of data model or schema 446 (generally, schema 446). Schema 446 specifies, defines or lists tax-related concepts or terms, e.g., by names, type or category and hierarchy such as "name," "social security number," "citizenship," "address," "employer," "interest," "dividends," "mortgage," "deduction," "tax credit," "capital gain," etc.

An instance 442 is instantiated or created for the collection of data received and for each term or topic of schema 446. Schema 446 may also specify data constraints such as a certain format of questions and answers (e.g., answer is binary (Y/N) or a number/value). It will be understood that schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of schema 446 that can be utilized in embodiments.

Instances or objects of a schema 446 element can be identified and distinguished (e.g., for multiple instances or objects of the same topic or tax form), and a generated identifier (ID) for an instance (I) based on schema 446 when writing data to shared data store 440. Thus, instances of runtime data 442 and non-binding suggestions 411 that may involve the same term or element of schema 446 are distinguished by the generated identifier (ID). For example, if a taxpayer has multiple Form W-2s for different jobs, or multiple 1099-INT forms for interest earnings from different financial institutions, these instances or objects of the same schema 446 element can be uniquely identified and distinguished. In this manner, calculation engine 480, TLA 410, and UI controller 430, initially and when processing non-binding suggestions 411, can uniquely identify the proper Form W-2 or Form 1099-INT that is the subject of a calculation result 482 or non-binding suggestion 411.

With continuing reference to FIG. 4, runtime data 442 of the shared data store 440 is used to eventually populate corresponding fields of an electronic tax return or electronic tax forms or documents and may be received from or based on data from various data sources 450a-d (generally, source 450). Examples of sources 450 or type of source data include user input or manual entry 450a of data into an interview screen 432 generated by UI controller 430, data imported from one or more prior year electronic tax returns 450b, which may be received from a computer 451 of a tax authority 452 with which the prior year electronic tax return was filed, a prior year tax return file locally stored on a user's computing device 453, or a tax return file from another tax preparation application 454. Further, embodiments involving a response engine 435 may, in certain embodiments, utilize a source or external resource 450 in the form of an on-line support community for the tax preparation application (e.g., LIVE COMMUNITY online support community for TURBOTAX tax preparation application). It will be understood that certain sources are in communication with UI controller 430 through respective networks although such networks are not specifically illustrated in FIG. 4.

For example, a tax preparation application constructed according to embodiments may be provided by Intuit Inc., and retrieves an electronic file that was prepared using a different tax preparation application available from H&R Block. Other examples of sources 450 or source data include data from online resources 450c (such as online social networks such as facebook.com, linkedin.com or other online resources) and third party databases 450d or resources (such as government databases or documents, such as property tax records, Department of Motor Vehicle (DMV) records, etc. Other examples of sources 450 include a financial management system such as Mint™, FINANCEWORKS, QUICKEN, and QUICKBOOKS financial management systems available from Intuit Inc., Mountain View, Calif.

A FMS account may include transaction data indicating categories or types of items or services purchased by a taxpayer and in some cases, item-level data, such as Level III data, identifying specific items or services that were purchased. A FMS is defined to include, any computing system implemented, on-line or web-based, system, package, program, module, or application that gathers financial data, has the capability to receive or retrieve financial data including item-level electronic transaction data, analyze and categorize at least part of the financial data into various reports or displays that are provided to a consumer, and provides consumer with the capability to conduct, and/or monitor, financial transactions. Types of financial management systems include, but are not limited to any of the following: an on-line, or web-based, or computing system implemented receipt collection financial management system, package, program, module, or application (generally, "system"), personal financial management system, personal accounting system, personal asset management system, personal/home business inventory system, business accounting system, business financial management system, business inventory system, business asset management system, healthcare expense tracking system, and data management system as discussed herein, and/or as known in the art at the time of filing, and/or as developed after the time of filing.

A source 450 may also be an account the user has with a financial institution (FI), such as a checking account or credit card account. Such FI accounts may also include transaction data for purchases made by taxpayer and may indicate a category of purchase or specific items that were purchased. Thus, UI controller 430 may receive data from and communicate with various sources or external resources 450.

With continuing reference to FIG. 4, TLA 410 reads runtime data 442 from shared data store 440 and utilizes or executes rules 461 expressed in a data structure such as decision table 460. The decision table 460 is based on graphical structure or completeness graph 465 to determine, based on currently available runtime electronic tax return data 442, what other data or answers are still needed in view of unanswered questions 462. In other words, TLA 410 determines what conditions of a rule 461 still need to be satisfied in order to reach a conclusion or completeness status for subject matter or topic of decision table 460, and in turn, which questions 462 of decision table 460 or other data structure should be presented to user in order to obtain that other needed data to reach a conclusion or state of completeness for that topic. For example, a rule 461 specified by decision table 460 may be based on a tax authority requirement or law, and may generally specify that If X, and Y, and Z, then Conclusion.

Rules 461 may involve various topics. "Tax" rules 461 that are utilized by rule engine 412 may specify types of data or tax documents that are required, or which fields or forms of the electronic tax return should be completed. One simplified example is if a taxpayer is married, then the electronic tax return is required to include information about a spouse. Tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of the data model or schema 446.

Rules 461 are utilized or scanned by TLA 410 to identify or narrow which questions 462, as provided in decision table 460, are identified as potential or candidate questions 462 to be presented to user. This may involve utilizing rules 461 based on one or more associated data structures such as decision table 460, which is based on a completion graph 465. Completion graph 465 recites, for example, requirements of tax authority or tax authority rules or laws. Decision table 460 may be used for invalidation of potential questions 462 or topics and input or runtime data 442 requirements.

FIGS. 5A-C and 6A-C illustrate graphically how tax legislation/tax rules 500 are broken down into completeness graph 465 and tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5A:
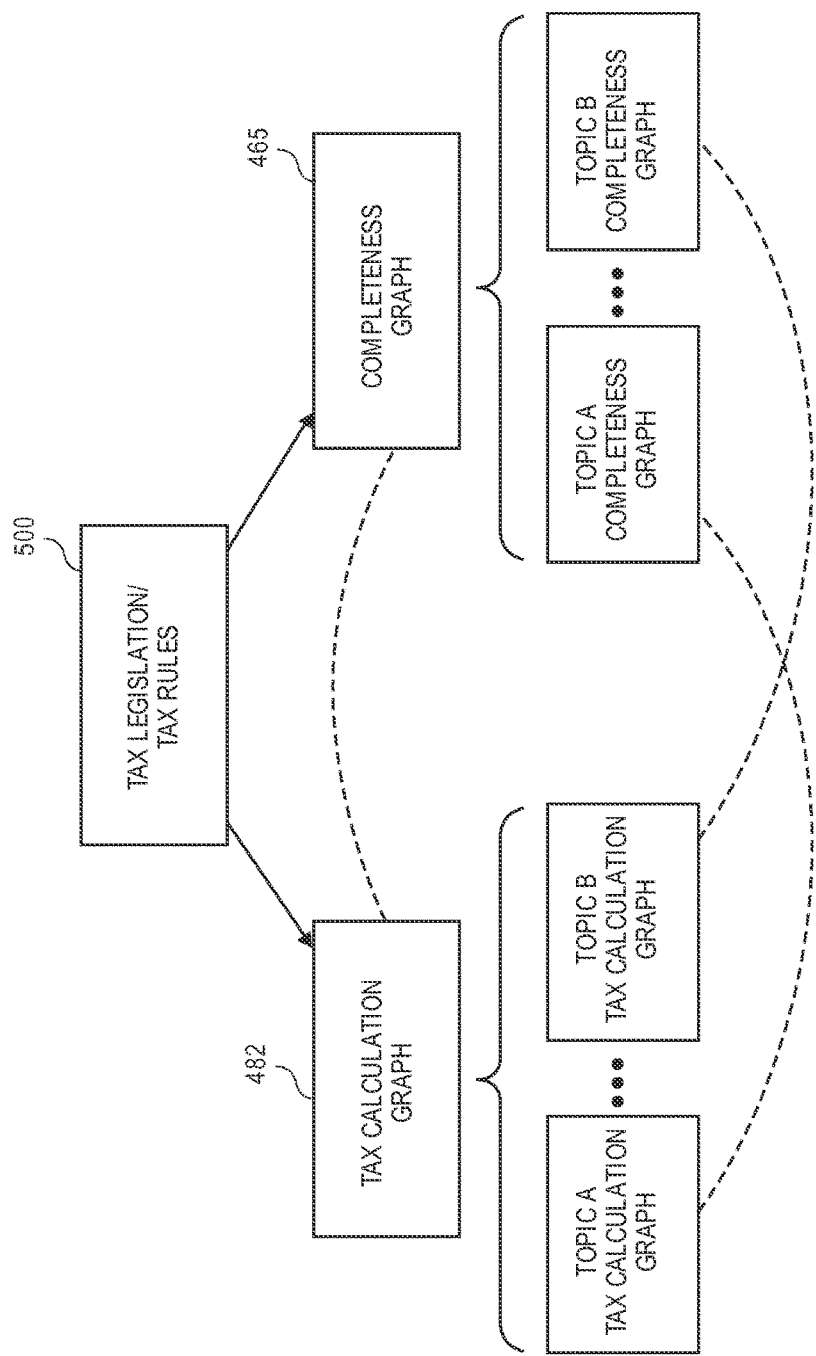
FIG. 5A schematically illustrates how tax legislation/tax rules are parsed and represented by a completeness graph and a tax calculation graph according to embodiments.

As shown in FIG. 5A, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, completion graph 465 may reference or be associated with a particular schema 446 element and associated instance data 442 in shared data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed for a particular topic or for a tax return as a whole such that the electronic tax return can be prepared and ultimately filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 5B:
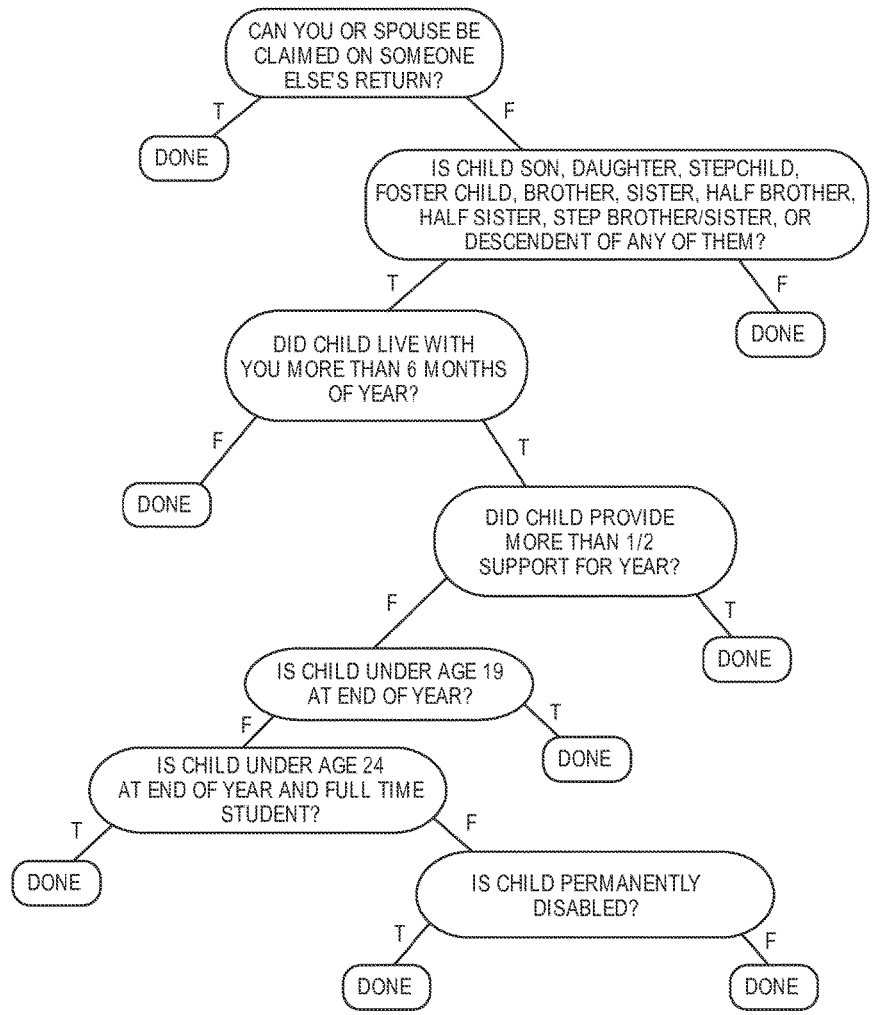
FIG. 5B illustrates an example of a simplified version of a completeness graph related to a qualifying child for purposes of determining deductions for federal income tax purposes.
Figure 5C:
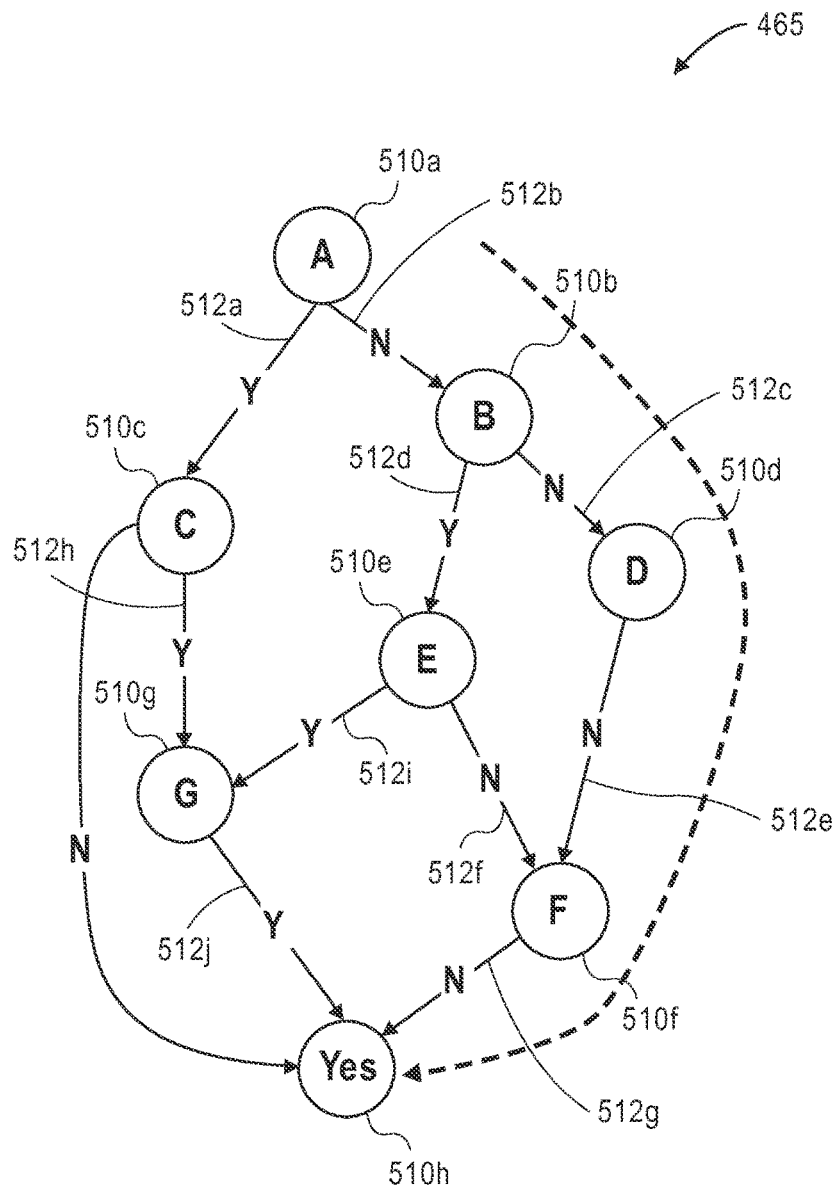
FIG. 5C illustrates an example of a directed graph or completeness graph.

Completeness graph 465 and tax calculation graph 482 represent graphical data structures that can be constructed in the form of tree, and decision table 460 reflects the structure and relationships expressed in completeness graph 465. FIG. 5C generally illustrates completeness graph 465 in the form of a tree structure including nodes 510a-g, in which node 510a is a beginning or start node, a "Yes" or termination node 510h indicating completion, and arcs 512 a-j representing different possible answers and the relationship between different nodes 510 or questions depend on a basic or general version of a completeness graph 465 for the particular topic, such as determining whether a child qualifies as a dependent for federal income tax purposes. FIG. 5B illustrates an example of a flow-chart based representation of questions, and a more complete flow chart-based representation of questions related to determining a "qualified child" may be found in U.S. patent application Ser. No. 14/097,057, entitled "Methods Systems and Computer Program Products for Applying Generates Rules for Personalized Interview Experience," the contents of which are incorporated herein by reference as though set forth in full.

Each node 510 in the completion graph 465 of FIG. 5C contains a condition that in this example is expressed as a Boolean expression that, in the illustrated embodiment, can be answered in the affirmative or negative. Arcs 512 that connect each node 510 illustrate the answers and dependencies between nodes 510, and the combination of arcs 512 in completeness graph 465 illustrates the various pathways to completion. A single arc 512 or combination of arcs 512 that result in a determination of "Done" represent a pathway to completion. As generally shown in FIG. 5C, there are several pathways to completion.

More specifically, FIG. 5C generally illustrates completeness graph 465 that includes beginning node (Node A) 510*a*, intermediate nodes (Nodes B-G) 510*b-g* and a termination node (Node "Yes" or "Done") 510*h*. Each of the beginning node 510*a*, and intermediate nodes 510*b-g* represents a question. Inter-node connections or arcs 512 represent response options. In the illustrated embodiment, each inter-node connection 512 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 5B, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 510 with a large number of pathways to completion. However, by many branches or lines within the completeness graph 465 can be ignored, for example, when certain questions internal to the completeness graph 465 are answered that eliminate other pathways, or other nodes 510 and arcs 512, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Referring to FIG. 6A, decision table 460 generated by transformation of completeness graph 465 illustrated in FIG. 5C reflects the question-and-answer flow of completeness or directed graph 465. In the illustrated example, rows of decision table 460 define rules 461*a-e* (e.g., Rules R1-R5 as shown in FIG. 6A), and columns of the decision table 460 indicate questions 462*a-g* (generally, questions) (Q1-Q5 shown in FIG. 4 OR Qa-Qg as shown in FIG. 6A). During processing, decision table 460 is scanned by TLA 410 to determine which answers 464 or which aspects of a rule 461 or condition elements are included in received runtime data 442 stored in TLA cache 414 and read from shared data store 440. TLA 410 determines how much the runtime data 442 completes decision table 460 and determines or selects candidate questions 462 to be presented to user, answers to which would complete respective rule 461 conditions reflected in decision table 460.

Thus, TLA 410 uses decision tables 460 to analyze the runtime data 442 and determine whether a tax return is complete, and each decision table 460 created for each topic or sub-topic is scanned or otherwise analyzed to determine completeness for each particular topic or sub-topic. In the event that completeness has been determined with respect to each decision table 460, then rule engine 412 outputs a "done" instruction to UI controller 430. If rule engine 412 does not output a "done" instruction that means there are one or more topics or sub-topics that are not complete, which, as explained in more detail below presents interview questions to a user for answer. TLA 410 identifies decision table 460 corresponding to one of the non-complete topics or sub-topics and, using the rule engine 412, identifies one or more non-binding suggestions 411 to present to UI controller 430. Non-binding suggestions 411 may include a listing of compilation of one or more questions from one or more decision tables 460.

The following pseudo code generally expresses how a rule engine 412 functions utilizing TLA fact cache 414 based on the runtime canonical data 442 or the instantiated representation of the canonical tax schema 446 at runtime and generating non-binding suggestions 411 provided as an input to UI controller 430. As described in U.S. application Ser. No. 14/097,057 incorporated herein by reference, data such as required inputs can be stored to fact cache 414 so that the needed inputs can be recalled at a later time, and to determine what is already known about variables, factors or requirements of various rules:

```
Rule engine (412) / Tax Logic Agent (TLA) (410)
// initialization process
Load_Tax_Knowledge_Base;
Create_Fact_Cache; While (new_data_from_application)
    Insert_data_into_fact_cache;
    collection = Execute_Tax_Rules; // collection is all the fired rules
and corresponding conditions
    suggestions = Generate_suggestions (collection);
    send_to_application(suggestions);
```

In one embodiment, as shown in FIG. 6B, statistical data 463*a-b* (which may be appended as columns to rule-question decision table 460 shown in FIG. 6A, may be received from or based on data collected by life knowledge module 490 described in further detail below) indicates how likely a question or topic 462 is to be relevant to a user given a set of runtime data 442 and may be utilized by rule engine 412 when determining which candidate question or topic 462 to select. Instead of, or in addition to, statistical data, embodiments may also involve TLA 410 executing one or more predictive models 492, which may be part of a predictive model library 495, for purposes of determining how likely a question or topic 462 is to be relative to a given user based on input runtime data 442. Examples of predictive models 492 that may be utilized for this purpose include predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 460 may include columns that contain statistical data 463 in the form of percentages. Column (STAT1 shown in FIG. 6B) may contain a percentage value that indicates taxpayers under the age of thirty-five where $Rule_1$ is satisfied. Another column (STAT2 shown in FIG. 6B) may contain a percentage value that indicates taxpayers over the age of thirty-five where $Rule_1$ is satisfied. Any number of additional columns could be added to the decision table 460 and statistics do not have to relate to an age threshold or grouping. Statistical data 463 may be used by the tax return preparation application to determine which of the candidate questions ($Q_A$-$Q_G$) 462 should be selected by TLA 410 for presentation to or asked of user. Statistical data 463 may be compared to one or more known taxpayer data fields (e.g., age, income level, tax filing status, geographic location, or the like) such that the question that is presented to the user is most likely to lead to a path to completion. Candidate questions 462 may also be excluded or grouped together and then presented to the user to efficiently minimize tax interview questions during the data acquisition process. For example, questions 462 that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

For example, life knowledge module 490 may indicate that taxpayers residing within a particular zip code are more likely to be homeowners than renters. TLA 410 may use this knowledge to weight particular questions related to these topics when processing rules 461 and questions 462 and generating non-binding suggestions 411. TLA 410 may also receive or otherwise incorporate information from life knowledge module 490 for these purposes. Life knowledge module 490 contains statistical or probabilistic data and/or results generated by predictive models related to the current or other users of the tax return preparation application and/or other taxpayers.

Non-binding suggestions 411 generated by TLA 410 may be, for example, a question, declarative statement, identification of a topic and may include a ranked listing of suggestions 411. Ranking may be weighted in order of importance, relevancy, confidence level, or the like. According to one embodiment, statistical data or results generated by predictive models may be incorporated by TLA 410 to be used as part of the candidate question ranking which, in turn, may be used by TLA 410 to assign a ranking to the non-binding suggestions 411 generated by TLA 410.

For example, questions 462 about home mortgage interest may be promoted or otherwise given a higher weight for users in particular zip codes or income levels. Statistical knowledge 490 or results generated by execution of predictive models may apply in other ways as well. For example, tax forms often require a user to list his or her profession. These professions may be associated with transactions that may affect tax liability. For instance, a taxpayer may list his or her occupation as "teacher." Life knowledge module 490 may contain data that shows that a large percentage of teachers have retirement accounts, and in particular, 403(b) retirement accounts. This information may then be used by tax logic agent 410 when generating its non-binding suggestions 411. For example, rather than asking generically about retirement accounts, the non-binding suggestion 411 can be tailored directly to a question about 403(b) retirement accounts. According to one embodiment, candidate question scoring and ranking is used to select candidate questions 462 to use to generate a non-binding suggestion 411, and according to another embodiment, ranking is also used to impose a ranking of non-binding suggestions 411 themselves for reference by UI controller 430.

For example, candidate questions 462 of a non-binding suggestion 411, and non-binding suggestions 411 themselves, may be ranked as described in U.S. application Ser. No. 14/462,058, filed Aug. 18, 2014, entitled "Computer Implemented Methods Systems and Computer Program Products for Ranking Non-Binding Suggestions During Preparation of Electronic Tax Return and U.S. application Ser. No. 14/461,982, filed Aug. 18, 2014, entitled "Computer Implemented Methods Systems and Computer Products for Candidate Question Scoring and Ranking During Preparation of Electronic Tax Return, the contents of all of which are incorporated herein by reference as though set forth herein in full. Such ranking may be based on, for example, a type of probability, estimate, assumption or inference determination, which may involve statistical analysis or execution of a predictive model using electronic tax return data as inputs.

Data that is contained within life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by life knowledge module 490. This information may be periodically refreshed or updated to reflect the most up-to-date relationships. Generally, the data contained in the life knowledge module 490 is not specific to a particular taxpayer but is rather generalized to characteristics shared across a number of tax payers although in other embodiments, the data may be more specific to an individual taxpayer.

In one embodiment, rule engine 412 reads runtime data 442 and uses that data 442 as answers or inputs to tax logic in the form of decision table 460 derived from or based on completion graph 465 to eliminate rules 461 that may apply which, is used to eliminate questions 462 from consideration rather than requiring the user to step through each question of a pre-determined sequence of questions in order to conclude that a particular tax situation or topic applies to the user.

Referring to FIG. 6C, and continuing with the example of decision table 465 shown in FIG. 6A, runtime data 442 that is known is used to determine which rows or rules 461 to cross out in decision table 460. In the illustrated example, if it is known from runtime data 442 that the answer to Question A is "Y" then rules 461 R3-R5 involving a "N" answer to Question A are not applicable, and those rows or rules 461 of decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462 that require answers based on the current runtime data 442 include Questions C and G. Thus, rule engine 412 uses decision table 460 to select one or more rules 461 and determine or select one or more candidate questions 462 that are unanswered in view of current runtime or instance data 442 and that should be presented or asked of the user to proceed to completion.

TLA 410 provides to UI controller 430 a non-binding suggestion 411 comprising a selected question or topic 461 to be addressed. In the illustrated embodiment, UI controller 430 includes a UI or user experience manager 430 that determines how to process the non-binding suggestions 411 with selected questions 461 and generates an interface or interview screen 432 for the UI or selects an interview screen of the UI based on the question or topic 461 of the non-binding suggestion 411. For ease of explanation, reference is made to interview screen generator 432 or resulting interview screen 432. UI controller 430 may include suggestion resolution element, a generator element, and an interview screen management element or flow/view management" module, as described in U.S. application Ser. No. 14/097,057, filed Dec. 4, 2013, entitled "Methods Systems and Computer Program Products for Applying Generated Rules for Personalized Interview Experience", the contents of which are incorporated herein by reference as though set forth in full.

For example, as described in the above-identified incorporated application, a configuration file 433 of UI controller 430 may specify whether, when and/or how non-binding suggestions 411 are processed. For example, a configuration file 433 may specify a particular priority or sequence of processing non-binding suggestions 411 such as now or immediate, in the current interview screen, in the next interview screen, in a subsequent interview screen, in a random sequence (e.g., as determined by a random number or sequence generator), or that UI controller 430 should wait for additional data and/or until a final review stage initiated by the user. As another example, this may involve classifying non-binding suggestions 411 as being ignored. A configuration file 433 may also specify content (e.g., text) of the interview screen that is to be generated based at least in part upon a non-binding suggestion 411.

UI manager 431 of UI controller 430 may include a generator element that is in communication with a suggestion element and that generates the resulting user interaction or experience or creates or prepares an interview screen 432 or content thereof based on the output of the suggestion element and input received from the interview screen management element. For this purpose, generator element may communicate with the interview screen management element, which manages a library of visual assets. Visual assets may be pre-programmed interview screens that can be selected by the interview screen management element and provided to the generator element for providing resulting interview screen 432 or content or sequence of interview screens 432 for presentation to the user. Visual assets may also include interview screen 432 templates, which are blank or partially completed interview screens 432 that can be utilized by the generation element to construct an interview screen on the fly during runtime in the event that an appropriate pre-programmed or pre-determined interview screen or other visual asset is not available or cannot be identified by the interview screen management element.

More specifically, in one embodiment, as described in the incorporated application, UI manager 431 of the UI controller 430 includes a suggestion resolution element or "Suggestion Resolver," a generator element or "Generator," and an interview screen management element or "Flow/View Management." The suggestion resolution element is responsible for resolving the strategy of how to respond to incoming non-binding suggestions 411. For this purpose, the suggestion resolution element may be programmed or configured internally, or based on interaction configuration files 433, which specify whether, when and/or how non-binding suggestions 411 are processed. For example, a configuration file 433 may specify a particular priority or sequence of processing non-binding suggestions 411 such as now or immediate, in the current interview screen, in the next interview screen, in a subsequent interview screen, in a random sequence (e.g., as determined by a random number or sequence generator), or that the UI manager 430 should wait for additional data and/or until a final review stage initiated by the user. As another example, this may involve classifying non-binding suggestions as being ignored. A configuration file 433 may also specify content (e.g., text) of the interview screen 423 that is to be generated based at least in part upon a non-binding suggestion 411.

The generator element is in communication the suggestion element and generates the resulting user interaction or experience or creates or prepares an interview screen 432 or user interface or content thereof based on the output of the suggestion element and input received from the interview screen management element. For this purpose, the generator element may communicate with the interview screen management element, which manages a library of visual assets. Visual assets may be pre-programmed interview screens that can be selected by the interview screen management element and provided to the generator element for providing the resulting interview screen or content or sequence of interview screens 432 to the UI for presentation to the user. Visual assets may also include interview screen templates, which are blank or partially completed interview screens that can be utilized by the generation element to construct an interview screen 432 on the fly during runtime in the event that an appropriate pre-programmed or pre-determined interview screen or other visual asset is not available or cannot be identified by the interview screen management element. The following exemplary pseudocode describes system components and data described above:

```
Suggestion Resolution Element
// Take a suggestion and consult the behavior configuration to
// decide which ones the UI will handle
Suggestions = Get_suggestions_from_TLA;
New_list = Rank_and_Filter(Suggestions, Configuration_File);
Generation Element
For each item in New_list
    UI_asset = Flow_View_Manager(item);
    If UI_asset == NULL // if Flow_View_Manager does not have
    any ready to go asset for the item
        Template = Get_Template(item) // identify a template based
on the item e.g. its type
        UI_asset = Construct_UI_Asset(Template, item)
    End
End
Interview Screen Management Element
    Provide look-up capability to return UI asset (flow/view) if there is
any, for given model field
```

For ease of explanation and illustration, reference is made to UI controller 430, which, given the use of data structures described herein, permits UI controller 430 to be loosely connected or even divorced from the TLA 410 and tax calculation engine 480 and the data used in tax calculations and stored in shared data store 440.

Figure 7:
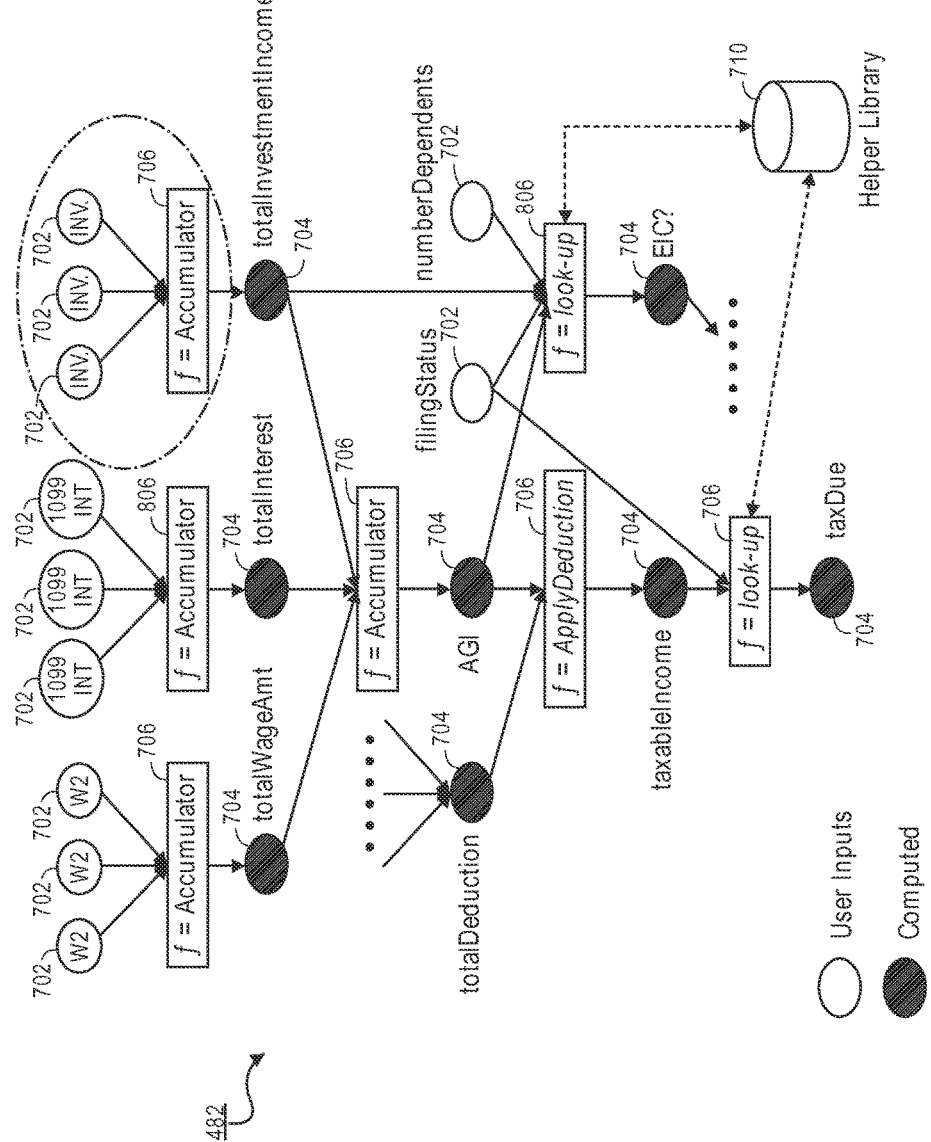
FIG. 7 illustrates an example of a calculation graph that is populated with runtime data and that includes input nodes, function nodes and result nodes.

With continuing reference to FIGS. 4 and 7, tax calculation engine 480 reads current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by TLA 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, tax calculation engine 480 will run calculation graphs 482 again to calculate a new AGI value, which would then be stored to shared data store 440.

FIG. 7 illustrates one example of a tax calculation graph 482. Tax calculation graph 482 semantically describes data dependent tax operations that used perform a tax calculation in accordance with the tax code or tax rules. Tax calculation graph 482 in FIG. 7 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 7, various nodes are input nodes 702. Examples of input nodes 702 in this particular example include data obtained from W-2 forms, data obtained from 1099-INT forms, data obtained from other investment income (INV), filing status, and number of dependents. Typically, though not exclusively, input nodes 702 are populated with user inputs. That is to say the user taxpayer will enter this information from a user interface as described herein. In other embodiments, however, nodes 702 may be populated with information that is automatically obtained by the tax preparation software. For example, in some embodiments, tax documents may be imaged or scanned with relevant data being automatically extracted using Optical Character Recognition (OCR) techniques. In other embodiments, prior tax returns may be used by the tax preparation software to extract information (e.g., name, potential dependents, address, and social security number) which can then be used to populate nodes 702. Online resources such as financial services websites or other user-specific websites can be crawled and scanned to scrape or otherwise download tax related information that can be automatically populated into nodes 702. Additional third party information sources such as credit bureaus, government databases, and the like can also be used by the tax preparation software to obtain information that can then be populated in to respective nodes 702.

In still other embodiments, values for nodes 702 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for nodes 702 may be estimated.

Still other internal nodes referred to as functional nodes 704 semantically represent a tax concept and may be calculated or otherwise determined using a calculation function 706, which generates a calculation result that is to be utilized in the electronic tax return (as opposed to other intermediate "functions" described below such as a hash function). Functional node 704 and the associated function 706 define a particular tax operation. For example, as seen in FIG. 7, operation refers to total wage income and is the result of the accumulator function 706 summing all W-2 income from input nodes 702. Functional node 704 may include a number in some instances. In other instances, the functional node 704 may include a response to a Boolean expression such as "true" or "false." Functional nodes 704 may also be constant values in some instances. Some or all of these functional nodes 704 may be labeled as "tax concepts" or "tax topics." The combination of a functional node 704 and its associated function 706 relate to a specific tax operation as part of the tax topic.

Interconnected function nodes 704 containing data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability. For example, examples of such commonly reoccurring functions 706 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 706 that is used to compute or calculate a tax liability is stored within a data store 710 which in some instances may be a database. The various functions 706 that are used to semantically describe data connections between function nodes 704 can be called upon by the tax preparation software for performing tax calculations. Utilizing these common functions 706 greatly improves the efficiency of the tax preparation software can be used by programmer to more easily track and follow the complex nature of the ever-evolving tax code. The common functions 706 also enables easier updating of the tax preparation software because as tax laws and regulations change, fewer changes need to be made to the software code as compared to prior "hard-wired" approaches.

Tax calculation graph 482 and the associated function nodes 704 and functions 706 can be tagged and later be used or called upon to intelligently explain to the user the reasoning behind why a particular result was calculated or determined by the tax preparation software program. Functions 706 can be de-coupled from a specific narrow definition and instead be associated with one or more explanations. Examples of common functions 706 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59 ½) require a 10% penalty. This penalty can be avoided, however, if an exemption applies such as the total and permanent disability of the participant. Other exemptions also apply. Such exemptions are found throughout various aspects of the tax code and tax regulations.

Function 706 may also include any number of mathematical or other operations. Examples of functions 706 include summation, subtraction, multiplication, division, and comparisons, greater of, lesser of, at least one of, calling of look-ups of tables or values from a database 710 or library as is illustrated in FIG. 7. It should be understood that function nodes 704 in tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 704 may be found in multiple locations within the tax calculation graph 482. Taxable income is another example of such a function node 704.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. Smart tax logic agent 410 running on set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

In the embodiment illustrated in FIG. 4, UI controller 430 also includes or utilizes an identity generator module that generates an identifier (ID) for an instance (I) to be generated based on schema 446 of shared data store 440. Thus, embodiments involve an ID generator that generates identifier (I) for instance (I) so that instances can be uniquely identified and non-binding suggestions 411 the same term or element of schema 446 can be distinguished.

For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 481 or suggestion 411, for example, and which ones are not.

Figure 8A:
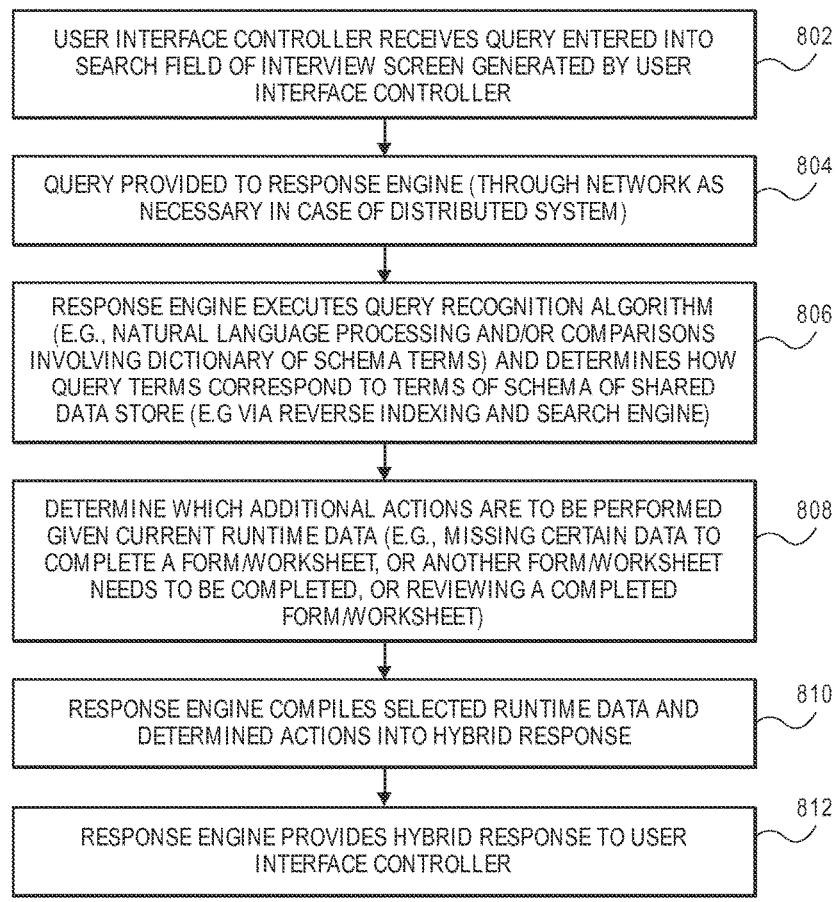
FIG. 8A is a flow diagram of one embodiment of a computer-implemented method for responding to queries submitted through an interview screen of a tax preparation application utilizing a response engine that accesses runtime data of the electronic tax return stored in a shared data store, and FIG. 8B generally illustrates how query search terms can be processed and matched to object or instance tokens in connection with responding to queries.
Figure 8B:
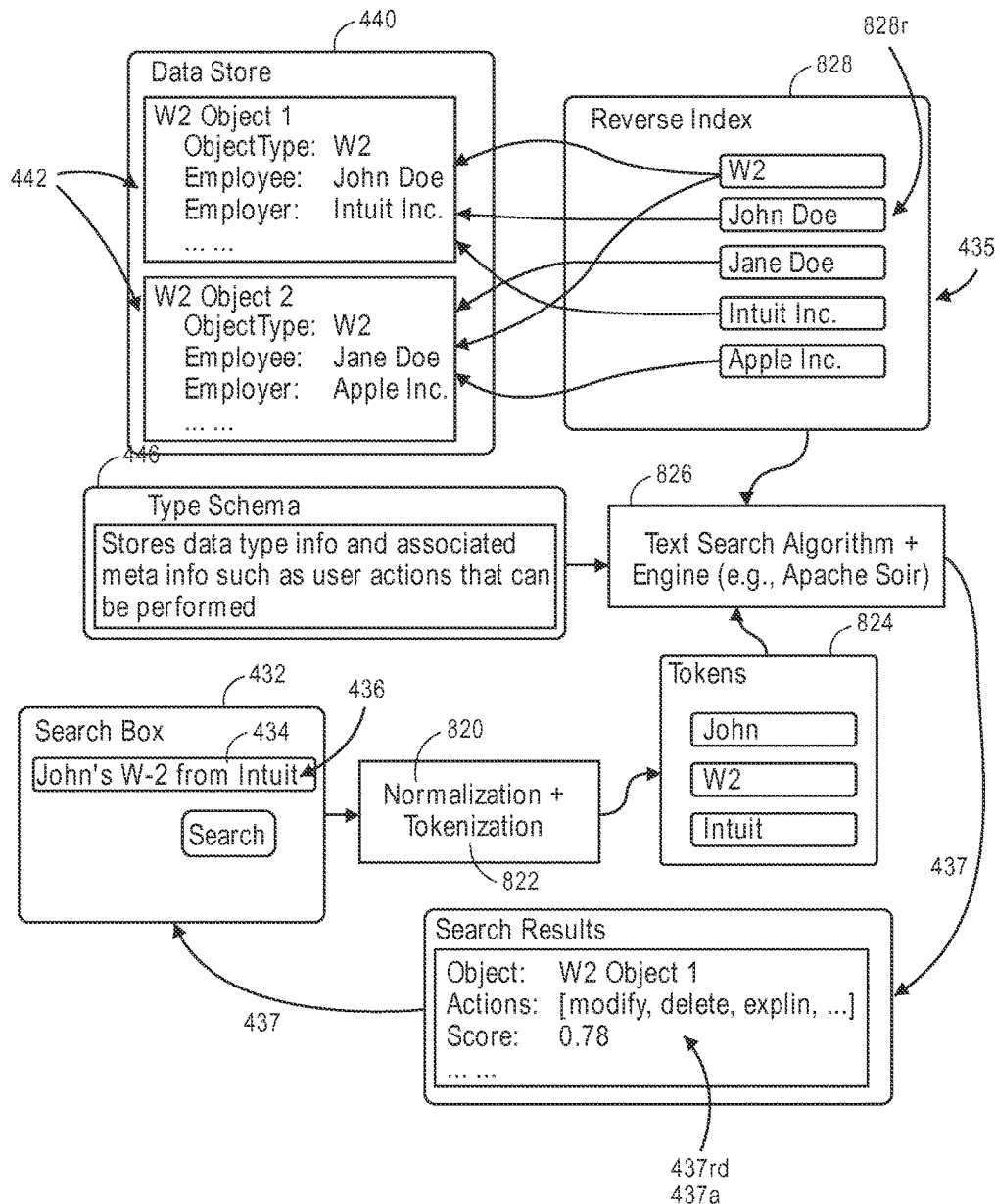

Having described system components and how they cooperatively operate to prepare an electronic tax return, embodiments involving response engine 435 are described with reference to FIGS. 8A-16. Referring to FIGS. 8A-B, at 802, UI controller 430 presents an interview screen 432 to user, e.g., based on a non-binding suggestion 411 generated by TLA 410 and receives a query 436, which is provided to response engine 435 at 804.

Figure 9:
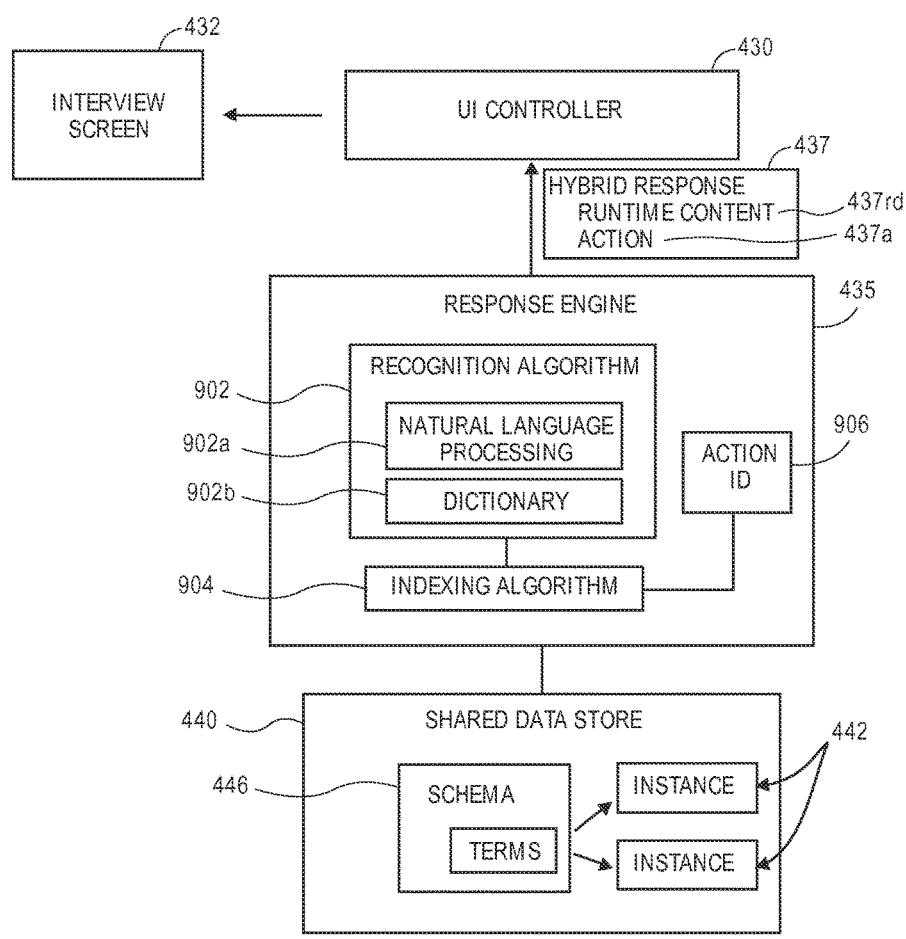
FIG. 9 is a block diagram of one embodiment of a response engine and how runtime data of the electronic tax return is utilized to generate a hybrid response.

With further reference to FIG. 9, and with continuing reference to FIGS. 8A-B, at 806, query recognition algorithm 902 of response engine 435 is executed to determine how the identified terms of the query 436 correspond to terms of schema 446 of shared data store 440 and associated instances or objects of runtime data 442, and at 808, determines which additional actions are to be performed given the current runtime data 442.

In the illustrated example shown in FIG. 8B, for steps 802-808, interview screen 432 includes a field 434 or section into which user enters or types a query 436. This may be in the form of a natural language question or a topic description such as "John's W2 from Intuit." A query recognition algorithm 902 may include or utilize one of various known natural language processing algorithms 902a and/or a dictionary 902b of pre-determined terms of the schema 446 of shared data store 440 (dictionary is not illustrated in FIG. 9, but is based on schema 446 terms) for purposes of query normalization 820 and tokenization 822. Continuing with the example shown in FIG. 8B involving "John's W-2 from Intuit," normalization 820 and tokenization 822 results in tokens 824 [John], [W2], and [Intuit], and serves as preprocessing steps to decompose the search query 436 for assessing the user's intent, and to provide for common terminology to be utilized in view of possible variances of search terms such as "W2," "W-2" and "Form W-2," and "Intuit," "Intuit Corp." "Intuit, Inc.," "Intuit Inc." for subsequent analysis of identifying matches or links with tokens of instances or objects in shared data store 440.

Results of normalization 820 and tokenization 822, based on terms of schema 446/dictionary 902b, are compared with results 828r of a linking algorithm, which may be or involve, for example, reverse indexing 828 applied to runtime data or objects 442 (e.g., involving a hash function or hash tree) and one of various known text search algorithms 826, such fuzzy matching and Apache Solr. For this purpose, a reverse index 828 is generated based on values of runtime objects 442 in shared data store 440, and such reverse index 828 may be updated as runtime data 442 is updated.

If text search algorithm 826 of response engine 435 identifies a match or link between a term of the query 436 and objects or runtime data 442, then actions are identified/compiled and a hybrid response 437 is generated at 810 and presented to the user through an interview screen 432 and 812. Action identification is based on schema 446, which defines or specifies which possible actions are available for various terms. Actions may include, for example, modify/edit, complete, view, delete, new/create or explain (e.g., determining and presenting a narrative explanation as explained in U.S. application Ser. No. 14/530,159, entitled SYSTEM AND METHOD FOR GENERATING EXPLANATIONS FOR TAX CALCULATIONS, the contents of which are hereby incorporated by reference as though set forth in full).

If a match is not identified, response engine 435 can generate an output for the UI controller 430 indicating that an alternative query 436 should be entered by the user until a match between a determined query 436 term and a schema 446 term.

For example, if the search involved "W-2" but there was no match, per the schema 446, an action for this situation would be "new/create" whereas if the search involved "spouse" and data (e.g., SSN, name, etc.) was already entered, the action for this situation may be "view," "delete" or "modify/edit" or "explain" whereas if no spouse information has been entered, a "new/create" action would be appropriate. Thus, these determinations can be made based on the current runtime data itself 442 independently of the tax logic agent 410 analysis and non-binding suggestions 411.

For example, an action may be to complete the interview screen 432, form or worksheet, whereas when an action may be to generate a new Form W-2 if one does not exist and the query 436 involves Form W-2 terms. An action may also be reviewing a completed interview screen, form or worksheet when the response engine determines that all data has been entered. In the event that an instance or object is missing certain data required to complete an interview screen 432, form or worksheet (e.g. as determined from an instance being tagged with certain data or tokens, but only some data being entered, and/or by response engine 435 consulting a completeness graph 465).

Thus, with the modular system configuration and method, which involves accessing the current runtime data 442 of the electronic tax return to formulate a hybrid response 435 to a query 436, embodiments utilizing the response engine 435 provide for personalized, contextual, multi-faceted responses 435 to queries 436 submitted through the tax preparation application and that reflect the current status of an electronic tax return or user's electronic tax return data profile.

For example, if a user query 436 involves a phrase "W2" the response engine 435 may retrieve all of the W2 related items or objects in the shared data store 440, and in addition to this runtime data content 437*rd*, the hybrid response 437 may include a button or link to an action 437*a* for entering new W2. However, if the search phrase of the query 436 is "Tom W2," then the hybrid response 437 may include Tom's W2 runtime data 437*rd* and buttons or links for an action 437*a* for certain schema-defined actions such as reviewing an interview screen 432 or form or editing data. Similarly, if the query 436 phrase is "Nancy W2," then a hybrid response 437 may include Nancy's W2 data 437*rd* and a button or link for certain schema-defined actions such as reviewing and editing. As a further example, if the query 436 phrase is "Intuit W2" then a hybrid response 437 may include W2s issued by Intuit (for one or multiple taxpayers), whereas a query phrase of "Tom Intuit W2" will retrieve Tom's W2 issued by Intuit, Inc. As a further example, a query 436 phase "ACA coverage" may result in a hybrid response 437 including a summary 437*rd* of ACA coverage information if already entered together with an action component 437*a* of a button for a schema-specified action of starting a form or modify or edit data previously entered. Otherwise, the hybrid response 437 may include an action component 437*a* of a button or link to allow the user to start entering ACA coverage information. As yet another example, a query 436 for "SSN" or "Social Security Number" will result in the response engine 437 retrieving all runtime data items that contain a social security number 437*rd* and a schema defined action component 437*a* to edit or review a screen or form if the social security number has been entered. As yet another example, if a query 436 is "Energy Efficient Window" the response engine 435 may include a schema defined action component 437*a* for displaying a deduction page for entering the relevant window information for a tax deduction or tax credit.

Figure 10A:
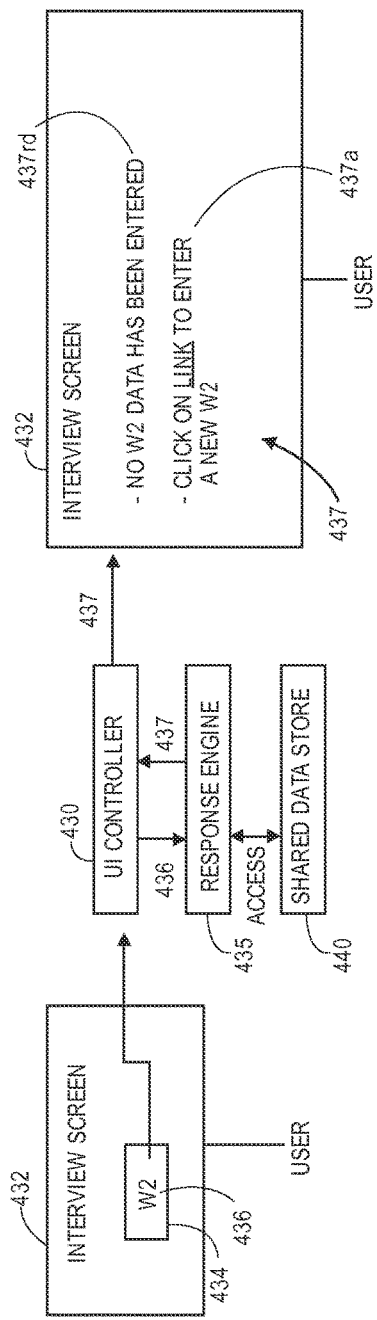
Figure 10B:
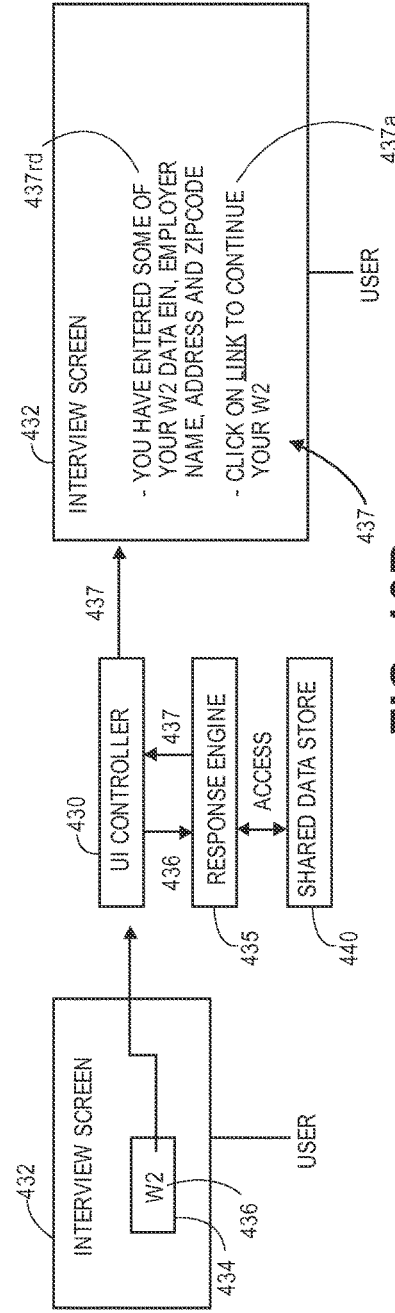
Figure 10C:
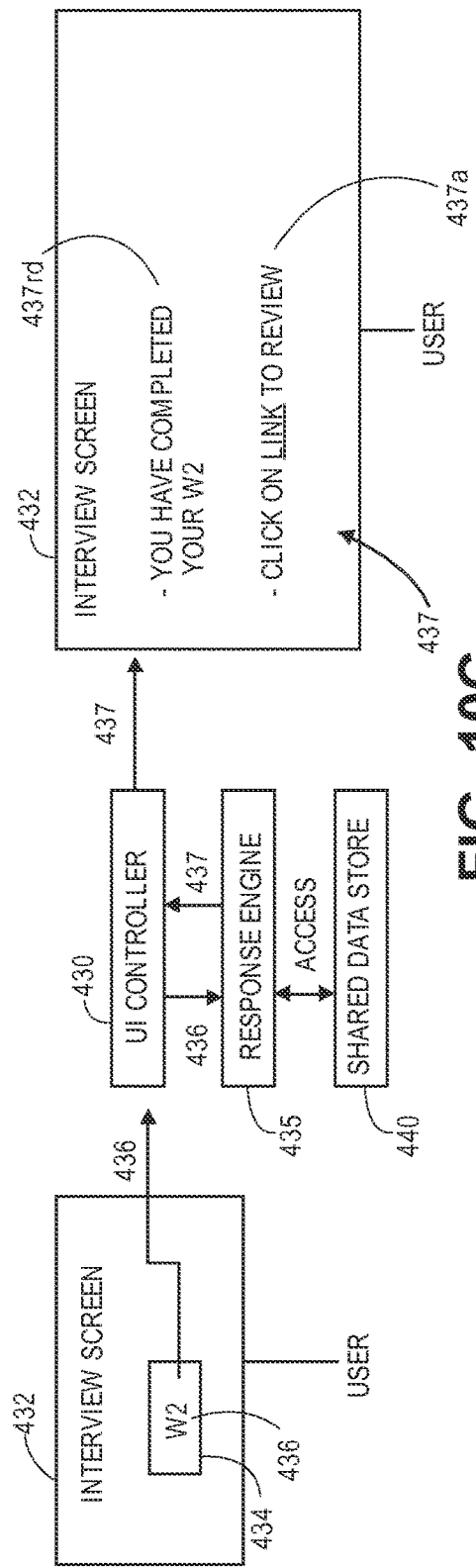

As a more detailed example, if the user enters "W2" into the field 434, but the response engine 435 determines that the shared data store 440 includes no W2 data, then an interview screen 432 as generally illustrated in FIG. 10A may be generated to indicate that the no W2 data has been entered and include a link 1002 to W2 interview screen or form. As another example, if the user enters "W2" into the query field 434, and the response engine 435 determines that the shared data store 440 includes some but not all of the required W2 data (e.g., includes EIN, Employer's name, address and zip code, Boxes 1-2 for Wages and Federal income tax withheld and the user's social security number), then a hybrid response 437 presented through an interview screen 432 as generally illustrated in FIG. 10B may to indicate which W2 data has already been entered (and/or not yet entered) and that the user needs to provide additional W2 data (Boxes 3-20) and includes an action component 437*a* in the form of a link to W2 interview screen or form. As a further example, if the user has completed Form W-2, and the "W2" into the query field 436, the response engine 435 may determine that the shared data store 440 includes all of the required W2 data. The response engine 435 may generate a hybrid result 437 that includes a content component 437*rd* indicating that all data has been received and an action component 437 indicating that the user needs to review the completed interview screen or form for Form W-2 or including a link 437*a* that will direct the user to the completed interview screen or form for Form W-2. When the link 437*a* is selected, the UI controller 430 may update the corresponding data in the shared data store 440 via a tag to indicate that the user has reviewed the data.

Figure 11:
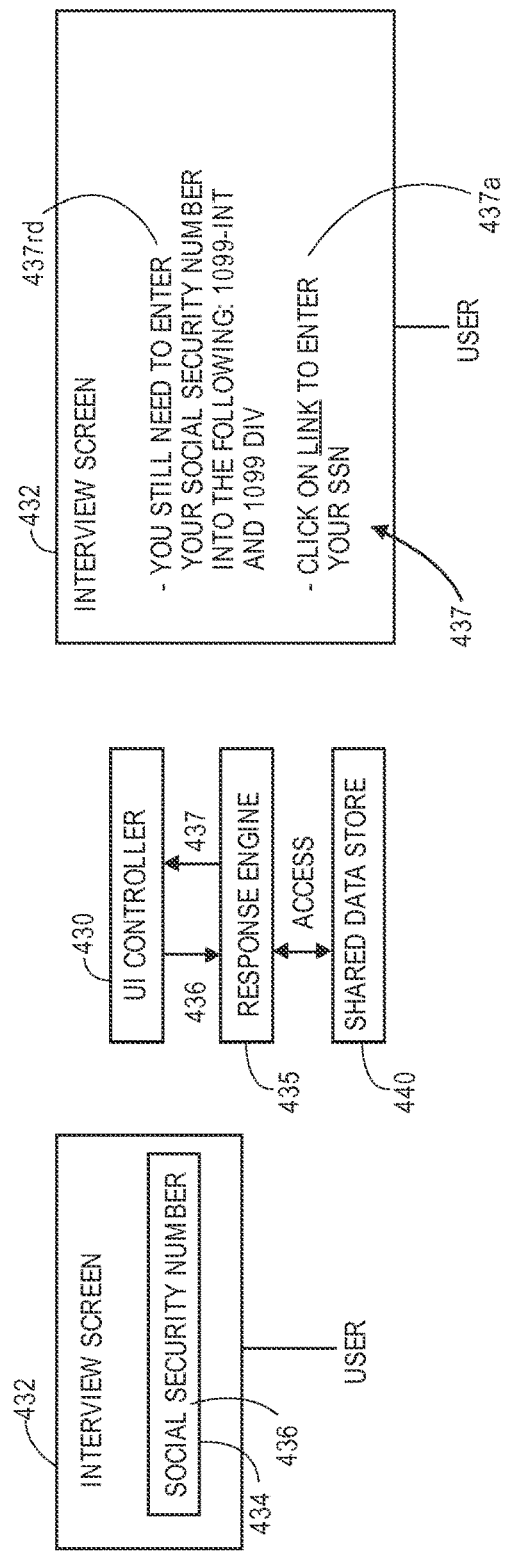
FIG. 11 generally depicts interview screens of a tax preparation application including a hybrid response to a query submitted through the tax preparation application and involving a particular type of data that may be applicable to various tax forms and an exemplary situation in which some but not all forms include a particular type of data.

As another example, referring to FIG. 11, if the query 436 is not about a form (as discussed above in examples involving Form W-2) but instead involves particular data, e.g., the user's SSN, then when the user enters a query 436 "SSN" or "Social Security Number," a hybrid response 437 may include a content component 437*rd* in the form of interview screens or forms that already include "SSN" and/or those that don't (as illustrated in FIG. 11) together with an action component 437*a* of a button or link that can be selected to direct the user to the interview screens or forms that still require SSN data.

Figure 12:
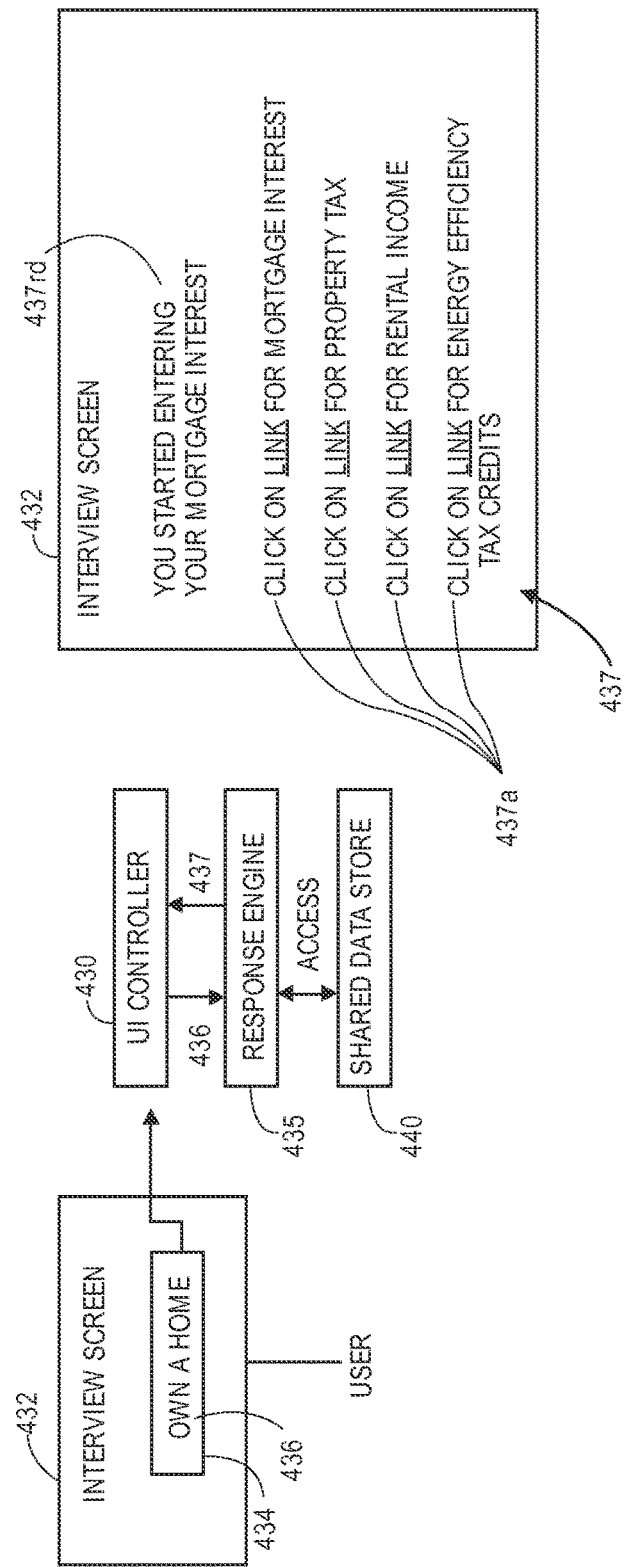
FIG. 12 generally depicts interview screens of a tax preparation application including a hybrid response to a query submitted through the tax preparation application and involving a particular tax topic and how a hybrid response may include multiple action components related to the particular tax topic.

As another example, referring to FIG. 12, a query 436 may result in identifying multiple actions 437*a* to be performed. Thus, if the user enters "own a home" into the query field 434, the resulting hybrid response 437 may include a content component of which forms or sections of the electronic tax return have been started or completed and that involve home ownership (such as mortgage interest), but include an action component in the form of a button or link to other potential action items 437*a* for additional possible deductions for property taxes, points and tax credits for energy efficient products such as new doors, windows, solar panels, etc. and rental or investment properties.

Thus, it will be understood that the embodiments may be utilized to process queries 436 involving particular tax forms and tax topics, particular types of data, and that such queries 436 may involve tax forms, topics and data generally or involve a particular user or taxpayer. Moreover, it will be understood that a hybrid response 437 may include runtime data content 437*rd* in the form of actual runtime data that is stored in the shared data store 440 (e.g., indicating that Wages=50,000), a type, category or identifier of runtime data (e.g., Wages) or a link thereto. Thus, the runtime data content 437*rd* of a hybrid response may include actual data or types or categories thereof, or as identified by sections of a form (e.g., certain boxes or sections). Moreover, a hybrid response 437 may identify data that has not been entered or that is missing, e.g., based on data segments or variables of a schema 446 element that have not been populated. Further, an associated action 437*a* may be in the form of an explanation of what the user needs to do given the current runtime data 442 or an explanation regarding a calculation result regarding certain data and/or include a link to the appropriate interview screen 432 or form of the tax preparation application. Accordingly, while reference is made to a "hybrid response" 437, it will be understood that the hybrid response 437 may include or involve different forms of runtime data content 437*rd* and actions 437*a*.

Figure 13:
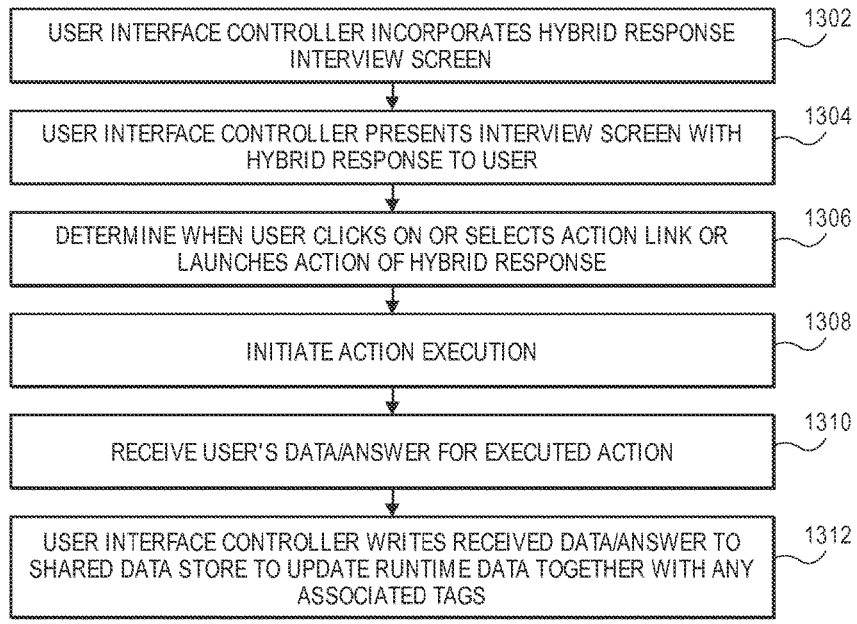
FIG. 13 is a flow diagram illustrating an algorithm for processing by a user interface controller that receives a hybrid response from a response engine and writing data to a shared data store.

Referring to FIG. 13, and with continuing reference to FIG. 4, at 1302 the UI controller 430 incorporates the hybrid response 437 into an interview screen 432, presents the interview screen 432 with hybrid response 437 to user at 1304. At 1306, the UI controller 430 determines when the user clicks on or selects action link 437*a* of the hybrid response 437 to initiate the action execution at 1308, e.g., to display an interview screen 432 that is the subject of the action 437*a*, and receives the user's data or answers for the executed action at 1301. While FIG. 4 illustrates different interview screens 432, one for entry of the query 436, and another for presentation of the hybrid response 435, it will be understood that the UI controller 430 may integrate the hybrid response 435 into the same interview screen 432 that includes the query, and that FIG. 4 is provided for purposes of illustration, not limitation. At 1312, the UI controller 430 writes received data/answers to the shared data store 440 to update runtime data 442 together with any associated tags (e.g., to indicate that an interview screen 432, form or data was reviewed when the action item 437*a* was to review data of a completed interview screen 432 or form).

Figure 14:
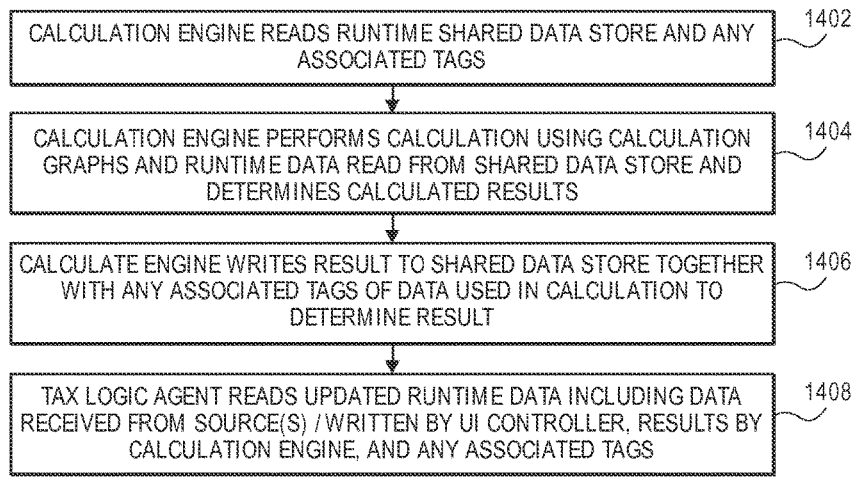
FIG. 14 is a flow diagram illustrating an algorithm for processing by a calculation engine of a computerized modular tax preparation application including processing of runtime data read from a shared data store and generating results that are written back to the data store.

Referring to FIG. 14, and with continuing reference to FIG. 4, at 1402, calculation engine 480 reads runtime data 442 from shared data store 440 (including any runtime data tags 442t such as tags identifying as original/unconfirmed runtime data, or confirmed/reviewed runtime data 442 (e.g., when actions 437s of a hybrid response 437 involve reviewing runtime data 442). At 804, calculation engine 480 uses calculation graphs 482 and runtime data 442 read from shared data store 440 and determines a calculation result 482. At 808, calculation engine 480 writes calculation result 482 to shared data 440 store together with any associated tags 442t.

Figure 15:
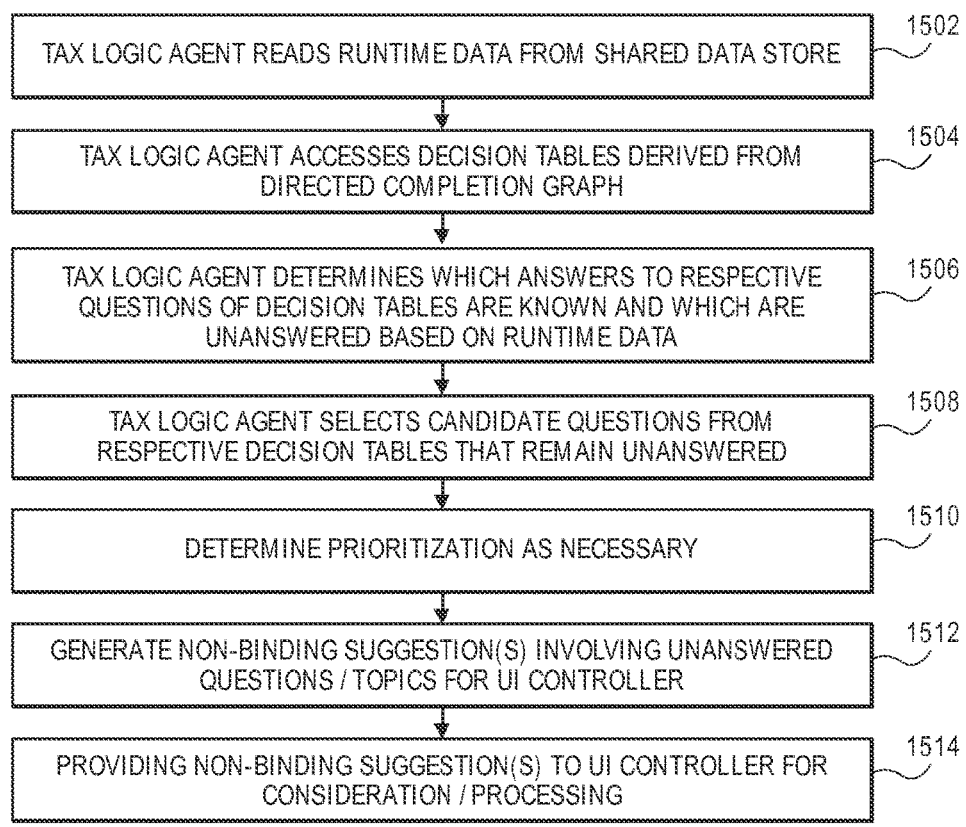
FIG. 15 is a flow diagram illustrating an algorithm for processing by a tax logic agent of a computerized modular tax preparation application that involves reading runtime data including results generated by calculation engine from a shared data store and analyzing a decision table to identify subject matter for non-binding suggestions.

Referring to FIG. 15, and with further reference to FIG. 4, at 1502, TLA 410 reads updated runtime data 442 (including electronic tax return data 442 received from source(s) 450, user answers or data provided in response to an executed action 437a of hybrid response 437 or by entry of data through other interview screens 432 and calculation result(s) 482 generated by calculation engine 480, and any associated tag(s) 442t from shared data store 440. At 1504, TLA 410 accesses decision tables 460, determines which answers to respective questions 462 of decision table(s) 460 are known based on runtime data 442 at 1506, and determines which selected unanswered questions 462/topics are based at least in part upon runtime data 442 including any tags 442t. At 1508, TLA 410 selects candidate question from decision table(s) 460 that remain unanswered given the runtime data 442, determines prioritization as necessary at 1510 (e.g., prioritize unanswered questions 462 associated with suspect data so that user can confirm or correct suspect data), and at 1512, generates non-binding suggestions 411 involving unanswered questions topics and/or for UI controller 430. At 1514, non-binding suggestions 411 are provided to UI controller 430 for processing.

Figure 16:
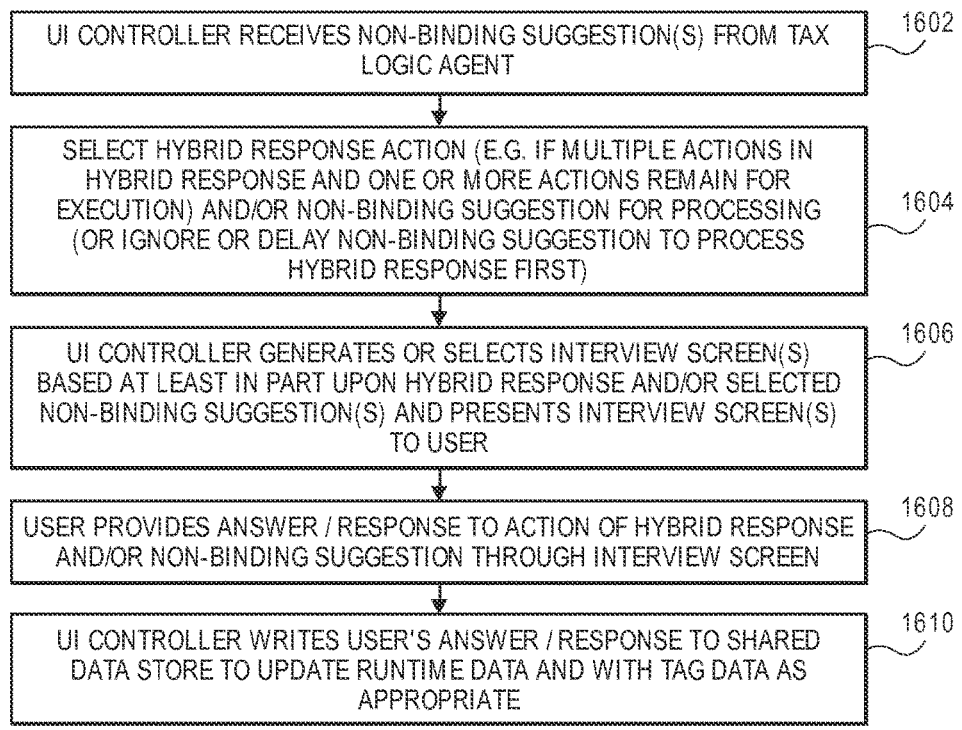
FIG. 16 is a flow diagram illustrating an algorithm for processing by a user interface controller of a computerized modular tax preparation application that involves processing non-binding suggestions generated by the tax logic agent and/or processing hybrid responses, and writing data received from the user and electronic sources and writing received data to a shared data store.

Referring to FIG. 16, at 1602, UI controller 430 selects non-binding suggestion(s) 411, e.g., according to a configuration file 433, and at 1604, selects one or more hybrid response actions 437a (e.g., if user did not act upon actions 437a of hybrid response 437) and generates or selects interview screen(s) 432 based at least in part upon actions 437a and/or non-binding suggestion(s) 411 and presents interview screen 432 to user. Thus, in operation, an interview screen 432 may include a question or topic that is based on a non-binding suggestion 411 generated by the tax logic agent 410, an interview screen 432 may include a hybrid response 437, an interview screen 432 may include questions or topics based on a non-binding suggestion 411 and an action 437a of a hybrid response 437, or non-binding suggestions 411 may also be added to or integrated into an interview screen 432 that includes a hybrid response 437 such that the user is simultaneously presented with actions 437a of a hybrid response 437 and other "action items" of questions or topics based on a non-binding suggestion 411.

According to one embodiment, a hybrid response 437 and actions 437a thereof generated by response engine 435 are prioritized relative to non-binding suggestions 411 generated by the tax logic agent 410. This prioritization may reflect the user's current interest or activity such that a non-binding suggestion 411 does not interrupt the user's workflow in addressing the action items 437a. Thus, the UI controller 430 may receive non-binding suggestions 411 generated by the tax logic agent 410 but delay acting upon or processing the non-binding suggestions 411 until certain processing involving the hybrid response 435 has occurred, e.g., the hybrid response 437 has been presented to the user, at least one action 437a of a hybrid response 437 is executed, or all actions 437a of a hybrid response 437 are executed.

According to one embodiment, after a pre-determined condition regarding processing of a hybrid response 435 has been satisfied, the UI controller 430 may then continue processing non-binding suggestions 411. Priority settings may be specified in a configuration file 433 of the UI controller 430.

According to another embodiment, certain non-binding suggestions 411 are selected by the UI controller 430 for incorporation into an interview screen 432 to be displayed with a hybrid response 437, thus creating another type of hybrid response in the sense that an interview screen 432 includes runtime data content and "action" items from two different sources, namely, the response engine 435 and the tax logic agent 119, which operate independently of each other and both of which access the shared data store 440 to read runtime data 442 For example, upon processing the query 436, e.g., based on an output of a natural language algorithm 902a and/or using a dictionary 902b of schema 446 terms as described above with reference to FIG. 9, the UI controller 320 may select non-binding suggestions 411 involving a term, topic or question that matches or is related to data generated by the response engine 435. As another example, upon processing the query 436 and generating a hybrid response 435, the UI controller 430 may select non-binding suggestions 411 involving a term, topic or question that matches or is related to runtime data 442 and/or actions 437a of the hybrid response 437 or related to such runtime data 442 and/or actions 437a of the hybrid response 437.

Continuing with reference to FIGS. 4 and 16, at 1608, the user provides answer/response 438 through interview screen 432, e.g., in response to an interview screen 432 presented in response to the user selecting a link or action element 437a of the hybrid response 437, and at 1610, UI controller 430 updates active runtime data 442 maintained by shared data store 440.

UI controller 430—hybrid response engine 435—calculation engine 480—TLA 410 processing is repeated until a state of completion with UI controller 430 writing data to shared data store 440, calculation engine 480 reading data from shared data store 440, TLA 410 reading data from shared data store 440 and generating non-binding suggestions 411 for consideration by UI controller 430, and response engine 435 processing queries submitted through an interview screen 432 of the UI controller 439. The electronic tax return, when completed, can be formatted as necessary and filed with a tax authority.

While FIG. 4 illustrates one example of how system components may be configured to implement embodiments, other system configurations may also be utilized give the modular nature of components. For example, other embodiments involve a distributed/networked configuration in which different modular components are hosted by respective computing devices and communicate through respective networks. For example, the UI controller 430 and response engine 435 may execute on a computer that is in communication through a first network with shared data store 440, calculation engine 480 may execute on another computer that is in communication through a second network with shared data store 440, and tax logic agent 110 may execute on another computer and is in communication with shared data store 440 through a third network and with UI controller 430 through a fourth network.

Figure 17:
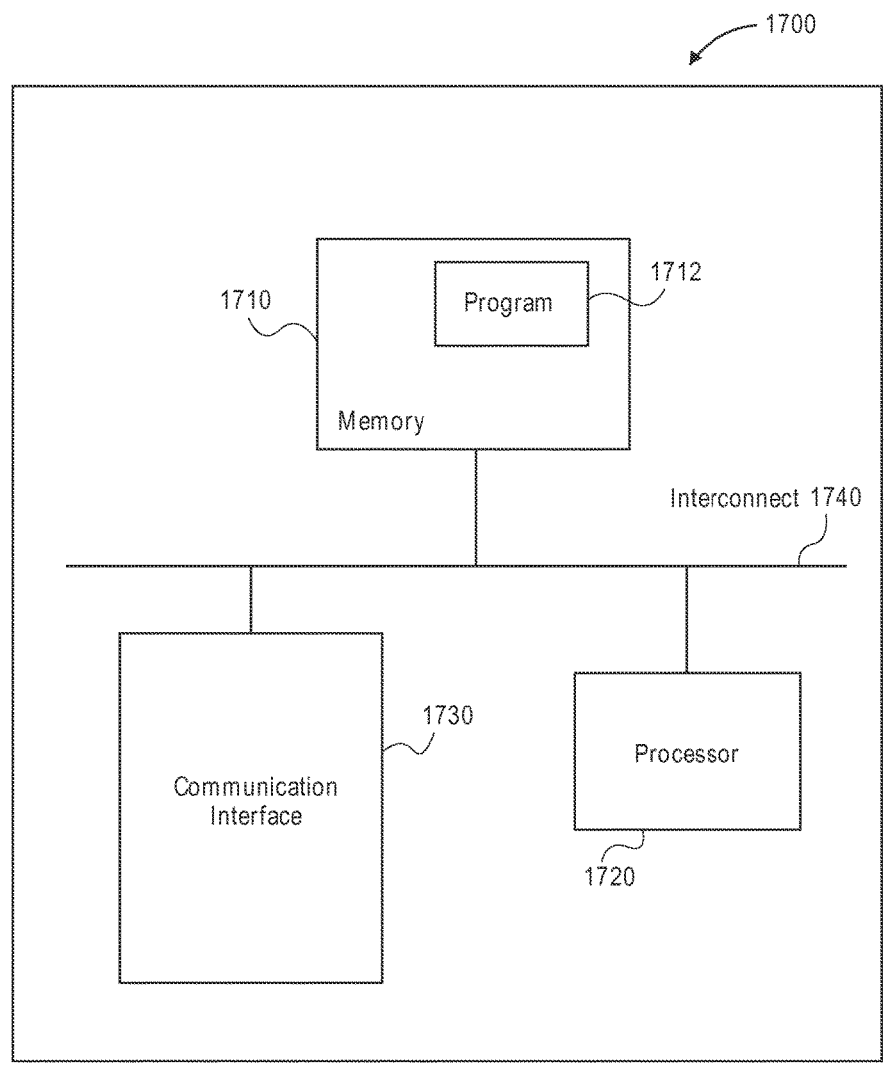
FIG. 17 is a block diagram of components of a computer system that may be programmed or configured to execute embodiments or aspects of embodiments, e.g., in a distributed modular tax preparation system in which components are in communication with each other through one or more networks.

FIG. 17 generally illustrates certain components of a computing device 2400 that may be utilized to execute or that may embody components of embodiments. For example, the computing device may include a memory

1710, program instructions 1712, a processor or controller 1720 to execute instructions 1712, a network or communications interface 1730, e.g., for communications with a network or interconnect 1740 between such components. The memory 1710 may be or include one or more of cache, RAM, ROM, SRAM, DRAM, RDRAM, EEPROM and other types of volatile or non-volatile memory capable of storing data. The processor unit 1720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1740 may include a system bus, LDT, PCI, ISA, or other types of buses, and the communications or network interface may, for example, be an Ethernet interface, a Frame Relay interface, or other interface. The network interface 1730 may be configured to enable a system component to communicate with other system components across a network which may be a wireless or various other networks. It should be noted that one or more components of computing device 1700 may be located remotely and accessed via a network. Accordingly, the system configuration provided in FIG. 17 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1720 performs steps or executes program instructions 1712 within memory 1710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, it will be understood that embodiments providing the ability to provide an action element that is based on the current runtime data in response to a query submitted from within the tax preparation application can be used to prepare various sections and portions of an electronic tax return. Thus, user interaction with a query field and execution of actions in hybrid responses may be used to prepare a portion of an electronic tax return, or even complete an electronic tax return. Thus, embodiments provide the ability to complete an electronic tax return without requiring the user to navigate a series of interview screens by instead interacting with a query field and acting upon the results generated by hybrid response engine.

Further, while embodiments are described with reference to a query submitted through a tax preparation application and a hybrid response being presented through the tax preparation application during preparation of an electronic tax return, other embodiments may involve submitting a query through a tax preparation application and transmitting the hybrid response to another computing device for review at a later time or by review or preparation by a different person.

While certain embodiments are described with reference to a hybrid or composite response that includes or involves runtime content or a snapshot of or the current runtime data of the electronic tax return and such runtime data indicating what has already been entered, the runtime data may be identified by name or category (e.g., "Social Security Number," "Wages" and "Federal Taxes Withheld"), name or category together with corresponding data (e.g., "Social Security Number: 123-45-6789," "Wages: $55,000" and "Federal Taxes Withheld: $5,000), or completed sections of a form (e.g., "You have completed Form-W2, Boxes 1, 2, 6, 9, 10). Further, a hybrid response may involve runtime content in the form of data that is still needed (e.g., You still need to enter Social Security Number, Form W-2, Boxes 3-5). Runtime content of a hybrid response may also include or identify both types of runtime data, i.e., data that has already been entered and data that is still needed. Moreover, while certain embodiments are described with reference to a hybrid or composite response that includes or involves runtime content or a snapshot of or the current runtime data of the electronic tax return and associated action items, other embodiments may include a response that includes an action explanation or action link, wherein the action that is included in the response is based at least in part upon the content or snapshot of the current runtime data of the electronic tax return as determined by the response engine accessing the shared data store.

It will also be understood that system components may be implemented as hardware (such as various types of programmable logic), software instructions, stored in a non-transitory medium and executed by one or more processors of one more computing devices, or a combination of hardware and software.

Additionally, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computerized tax return preparation system comprising:
   a shared data store; and
   at least one processor configured to perform processing comprising:
   presenting, by a user interface controller process, at least one interview screen to a user of the computerized tax preparation system, the interview screen comprising a search field for entry of a query by the user through the interview screen;

writing, by the user interface controller process, data to the shared data store to update runtime data of a current electronic tax return, the runtime data including user-supplied data and results of calculations performed using the user-supplied data;

reading, by a tax logic agent process independent of the user interface controller process, the runtime data from the shared data store;

analyzing, by the tax logic agent process, the runtime data for compliance with one or more rules;

generating, by the tax logic agent process, one or more non-binding suggestions of unanswered questions or topics for consideration by the user interface controller process based on the analyzing;

receiving, by a response engine process independent of the tax logic agent process, the query entered into the search field;

generating, by the response engine process, a hybrid result in response to the query, the hybrid result comprising:
at least one of the non-binding suggestions,
runtime data of the shared data store that is selected based at least in part upon the search query, and
an action to be performed for preparation of the electronic tax return;

receiving, by the user interface controller process, the hybrid result; and presenting, by the user interface controller process, an interview screen comprising the hybrid result to the user in response to the query during preparation of the electronic tax return.

2. The system of claim 1, the processing further comprising, by the response engine process:
determining, by a query recognition component, terms of the search query that correspond to pre-determined terms of a schema of the shared data store;
associating, by a linking algorithm, runtime data of the electronic tax return in the shared data store with terms of the search query; and
determining, by an action identifier, which actions are to be included in the hybrid result.

3. The system of claim 2, the query recognition component comprising a natural language processing algorithm.

4. The system of claim 2, the query recognition component comprising a dictionary of pre-determined terms of the schema of the shared data store.

5. The system of claim 2, the linking algorithm comprising a reverse indexing algorithm that is executable on runtime data of the shared data store.

6. The system of claim 1, the processing further comprising, by the user interface controller process, processing the hybrid result by generating or selecting an interview screen including the selected runtime data and the action and presenting the generated or selected interview screen to the user.

7. The system of claim 1, the processing further comprising, by the user interface controller process, prioritizing processing of the hybrid result over a non-binding suggestion generated by the tax logic agent.

8. The system of claim 1, the processing further comprising, by the user interface controller process, processing the hybrid result and a non-binding suggestion generated by the tax logic agent by generating a single interview screen merging hybrid result and the question or topic of the non-binding suggestion.

9. The system of claim 1, the processing further comprising, by the response engine process, determining an action to be included in the hybrid result when the shared data store does not contain runtime data for the response to the search query.

10. The system of claim 1, the processing further comprising, by the response engine process, determining an action to be included in the hybrid result when the shared data store contains runtime data for a topic or question related to the search query and which requires additional data for completion.

11. The system of claim 1, the processing further comprising, by the response engine process, determining an action of completing a form or worksheet when the shared data store contains runtime data that partially completes the form or worksheet.

12. The system of claim 1, the processing further comprising, by the response engine process, determining an action of reviewing a form or worksheet when the shared data store contains runtime data that completes the form or worksheet.

13. The system of claim 1, the hybrid search result runtime data comprising raw runtime data.

14. The system of claim 1, the hybrid search result runtime data comprising schema terms of types or labels of respective runtime data without the associated raw runtime data.

15. The system of claim 1, the hybrid search result comprising a link to the runtime data, wherein when the link is selected by the user, the runtime data of the hybrid result is displayed to the user.

16. The system of claim 15, the hybrid search result comprising a link to the action, wherein when the link is selected by the user, a form or worksheet of the electronic tax return that is to be completed is displayed to the user.

17. The system of claim 1, the hybrid search result comprising a link to the action, wherein when the link is selected by the user, a form or worksheet of the electronic tax return that is to be completed is displayed to the user.

18. The system of claim 1, the hybrid result comprising a first action to be performed for preparation of a first form or worksheet that is at least partially populated with the runtime data and a second action to be performed for a second form or worksheet that is to be prepared with other data that is not stored in the shared data store.

19. The system of claim 1, the processing further comprising, by the response engine process, identifying multiple actions, wherein respective actions are identified by respective links for respective actions are organized within a data structure that is presented to the user through one or more interview screens generated by the user interface controller.

20. The system of claim 1, the processing further comprising:
reading, by a calculation engine process, the runtime data from the shared data store;
performing, by the calculation engine process, calculations utilizing the runtime data and a calculation graph to generate a calculation result; and
writing, by the calculation engine process, the calculation result to the shared data store.

21. The system of claim 20, the processing further comprising, by the calculation engine process, populating a directed calculation graph with runtime data.

22. The system of claim 21, the directed calculation graph comprising a plurality of nodes comprising:
input or leaf nodes comprising data for specific tax-related items;

function nodes associated with respective functions, wherein respective input nodes are associated with respective function nodes, and inputs to a function include data of respective associated input nodes; and result nodes associated with respective functions nodes, a result node comprising an output generated by function associated with a function node.

23. The system of claim 20, the processing further comprising:

reading, by the tax logic agent process, updated runtime data from the shared data store including data written to the shared data store by the user interface controller and the result generated by the calculation engine; and generating, by the tax logic agent process, a non-binding suggestion for the user interface controller based at least in part upon analysis of the tax logic utilizing updated runtime data.

24. The system of claim 1, wherein the at least one processor comprises a plurality of processors that are components of a distributed tax preparation application that execute commands on respective different computers and are in communication with each other through respective networks.

25. The system of claim 1, the processing further comprising receiving electronic tax return data from an electronic source and writing the received electronic tax return data to the shared data store, wherein the electronic tax return is substantially completed based at least in part upon the imported electronic tax return data and user interaction with the search field.

26. The system of claim 1, the processing further comprising:

transmitting, by the response engine process, the query through a network to an external computing resource; and receiving, by the response engine process, a result generated by the external computing resource, the hybrid result including the result generated by the external computing resource.

27. The system of claim 26, wherein the external computing resource is an online support community for the tax preparation application.

28. The system of claim 27, wherein the result generated by the online support community is not written to the shared data store.

29. A computer-implemented method for providing search capabilities in a tax preparation application operable to prepare an electronic tax return, the method being performed by one or more processors of one or more computers and comprising:

presenting, by a user interface controller, at least one interview screen to a user of the tax preparation application, the interview screen comprising a search field for entry of a query by the user through the interview screen;

writing, by the user interface controller, data to a shared data store to update runtime data of a current electronic tax return, the runtime data including user-supplied data and results of calculations performed using the user-supplied data;

reading, by a computerized tax logic agent independent of the user interface controller, the runtime data of the electronic tax return from the shared data store;

processing, by the tax logic agent, a decision table derived from a directed completion graph based at least in part upon the runtime data; and generating, by the tax logic agent, one or more non-binding suggestions of a question or topic to present to a user of the tax preparation application based at least in part upon the decision table processing;

transmitting, by the tax logic agent, the non-binding suggestion to the user interface controller;

receiving, by a response engine independent of the tax logic agent, query data entered into the search field by the user;

accessing, by the response engine, the shared data store;

generating, by the response engine, a hybrid result in response to the query, the hybrid result comprising:
    at least one of the non-binding suggestions,
    runtime data of the shared data store that is selected based at least in part upon the search query, and
    an action to be performed for preparation of the electronic tax return;

receiving, by the user interface controller, the hybrid result; and presenting, by the user interface controller, an interview screen comprising the hybrid result to the user.

* * * * *